US012639827B1

(12) United States Patent
Kim et al.

(10) Patent No.: US 12,639,827 B1
(45) Date of Patent: May 26, 2026

(54) METHOD FOR ESTIMATING MOTION OF OBJECT BASED ON VISION SENSOR AND OBJECT MOTION ESTIMATING DEVICE USING THE SAME

(71) Applicant: StradVision, Inc., Pohang-si (KR)

(72) Inventors: Il Hwa Kim, Yongin-si (KR); Dong Geol Yang, Seoul (KR)

(73) Assignee: StradVision, Inc., Pohang-si (KR)

( * ) Notice: Subject to any disclaimer, the term of this patent is extended or adjusted under 35 U.S.C. 154(b) by 0 days.

(21) Appl. No.: 19/290,432

(22) Filed: Aug. 5, 2025

(30) Foreign Application Priority Data

May 20, 2025 (KR) ........................ 10-2025-0065482

(51) Int. Cl.
 *G06T 7/20* (2017.01)
(52) U.S. Cl.
 CPC ...... *G06T 7/20* (2013.01); *G06T 2207/20084* (2013.01); *G06T 2207/30252* (2013.01)
(58) Field of Classification Search
 None
 See application file for complete search history.

(56) References Cited

U.S. PATENT DOCUMENTS

| | | | |
|---|---|---|---|
| 11,195,418 B1 * | 12/2021 | Hong ................. | G01C 21/3602 |
| 12,313,409 B2 | 5/2025 | Faragher et al. | |
| 2020/0218979 A1 | 7/2020 | Kwon et al. | |
| 2021/0110552 A1 * | 4/2021 | Bhat ......................... | G06T 7/70 |
| 2021/0241004 A1 | 8/2021 | Abbott et al. | |

| | | | |
|---|---|---|---|
| 2021/0323545 A1 | 10/2021 | Jang | |
| 2022/0057992 A1 * | 2/2022 | Kawasaki .............. | G06V 20/52 |
| 2022/0111860 A1 | 4/2022 | Brahma | |

(Continued)

FOREIGN PATENT DOCUMENTS

| | | |
|---|---|---|
| CN | 116434520 A1 | 7/2023 |
| JP | 2002133212 A | 9/2022 |
| JP | 2023159227 A1 | 10/2023 |

(Continued)

OTHER PUBLICATIONS

Jeong et al ("Surround vehicle motion prediction using LSTM-RNN for motion planning of autonomous vehicles at multi-lane turn intersections." IEEE Open Journal of Intelligent Transportation Systems 1 (2020): pp. 2-14) (Year: 2020).*

(Continued)

*Primary Examiner* — Leon Viet Q Nguyen
(74) *Attorney, Agent, or Firm* — Eschweiler & Potashnik, LLC

(57) ABSTRACT

There is provided a method for estimating a motion of an object based on a vision sensor. The method includes steps of: (a) inputting a t-th vision sensor data and a t-th vehicle system data into a data preprocessing module, to thereby instruct the data preprocessing module to preprocess a t-th vision sensor data and a t-th vehicle system data and thus to generate a t-th vector for estimating object motion, and (b) inputting the t-th vector for estimating the motion of the object into a deep learning based sequential regression network, to thereby instruct the sequential regression network to perform a recurrent learning operation on the t-th vector for estimating object motion and thus to generate a t-th prediction object motion data which is a result of predicting object motion corresponding to the t-th image frame.

20 Claims, 10 Drawing Sheets

(56) References Cited

U.S. PATENT DOCUMENTS

2024/0059285 A1* 2/2024 Ng ........................ B60W 50/14

FOREIGN PATENT DOCUMENTS

| | | | |
|---|---|---|---|
| JP | 2024004450 | A1 | 1/2024 |
| JP | 7431025 | B2 | 2/2024 |
| KR | 1020250056127 | A | 4/2025 |

OTHER PUBLICATIONS

Japanese Notice of Allowance dated Oct. 7, 2025 in Connection with JP Application No. 2025-117264.

Extended European Search Report dated Feb. 10, 2026 in connection with EP Application No. 25194630.7.

Guo Ge et al: "3D Multi-Object Tracking With Adaptive Cubature Kalman Filter for Autonomous Driving", IEEE Transactions on Intelligent Vehicles, IEEE, vol. 8, No. 1, Mar. 9, 2022 (Mar. 9, 2022), pp. 512-519, XP011932743, ISSN: 2379-8858, DOI: 10.1109/TIV.2022.3158419 [retrieved on Jan. 23, 2023].

Hu Hou-Ning et al: "Joint Monocular 3D 1-22 Vehicle Detection and Tracking", 2019 IEEE/CVF International Conference on Computer Vision (ICCV), Oct. 1, 2019 (Oct. 1, 2019), pp. 5390-5399, XP093359508, Retrieved from the Internet: URL: https://openaccess.thecvf.com/content_ICCV_2019/papers/Hu_Joint_Monocular_3D_Vehicle_Detection_and_Tracking_ICCV_2019_paper.pdf>.

Harlow K et al: "Navigating Visually Degraded Environments Using Millimeter Wave Radar", Dec. 31, 2024 (Dec. 31, 2024), XP093359509, ISBN: 979-8-34-687755-4 Retrieved from the Internet: URL:https://www.proquest.com/docview/3148711368/B5C2795041394450PQ/1?accountid=29404.

* cited by examiner

FIG. 3

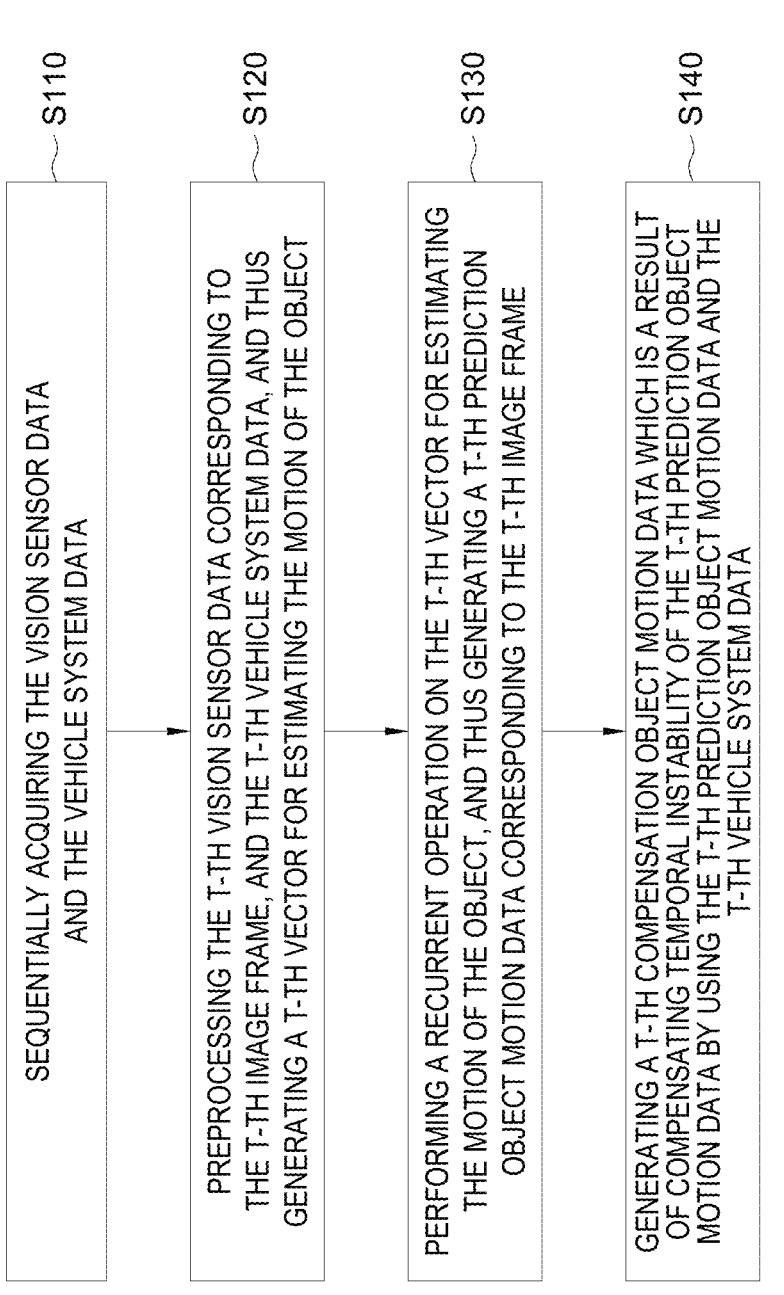

SEQUENTIALLY ACQUIRING THE VISION SENSOR DATA AND THE VEHICLE SYSTEM DATA ⟋ S110

PREPROCESSING THE T-TH VISION SENSOR DATA CORRESPONDING TO THE T-TH IMAGE FRAME, AND THE T-TH VEHICLE SYSTEM DATA, AND THUS GENERATING A T-TH VECTOR FOR ESTIMATING THE MOTION OF THE OBJECT ⟋ S120

PERFORMING A RECURRENT OPERATION ON THE T-TH VECTOR FOR ESTIMATING THE MOTION OF THE OBJECT, AND THUS GENERATING A T-TH PREDICTION OBJECT MOTION DATA CORRESPONDING TO THE T-TH IMAGE FRAME ⟋ S130

GENERATING A T-TH COMPENSATION OBJECT MOTION DATA WHICH IS A RESULT OF COMPENSATING TEMPORAL INSTABILITY OF THE T-TH PREDICTION OBJECT MOTION DATA BY USING THE T-TH PREDICTION OBJECT MOTION DATA AND THE T-TH VEHICLE SYSTEM DATA ⟋ S140

1450

S210 — ACQUIRING IMAGE FRAMES, AN ACTUAL VEHICLE SYSTEM DATA AND A RADAR DATA, ACCORDING TO THE ACTUAL VEHICLE DRIVING

S220 — SELECTING A CAMERA TARGET FROM THE IMAGE FRAMES (CIPV)

S230 — MATCHING A CAMERA-RADAR TRACK FOR THE TARGET

S240 — GENERATING SEQUENTIAL DATA INCLUDING THE DISTANCE, THE VELOCITY, AND THE ACCELERATION OF THE TARGET

S250 — DATA PREPROCESSING AND AUGMENTATION

METHOD FOR ESTIMATING MOTION OF OBJECT BASED ON VISION SENSOR AND OBJECT MOTION ESTIMATING DEVICE USING THE SAME

CROSS REFERENCE TO RELATED APPLICATION

This application claims the benefit of priority to Korean Patent Application No. 10-2025-0065482, filed on May 20, 2025, the entire contents of which are incorporated herein by reference.

FIELD OF THE DISCLOSURE

The present disclosure relates to a method for estimating a motion of an object based on a vision sensor and an object motion estimating device using the same.

BACKGROUND OF THE DISCLOSURE

In general, ADAS (i.e., Advanced Driving Assistant System) is a system that assists and supports safe and convenient driving of a vehicle.

Vehicles are equipped with various recognition sensors such as radar, lidar, cameras, and ultrasound, and safety technologies for detecting approaching vehicles, pedestrians, and obstacles by utilizing these recognition sensors to thereby warn drivers of danger in advance or to actively assist avoiding accidents are being applied.

For example, various safety technologies such as a Forward Collision Warning (FCW) system which monitors a velocity of a vehicle (as an autonomous vehicle) and a relative velocity with respect to another vehicle in front and warns a driver of a risk of collision if a distance from the another vehicle in front becomes too close, a Lane Departure Warning (LDW) system which monitors a driving situation ahead to warn the driver by detecting whether the vehicle is departing from a driving lane, a Blind Spot Warning (BSW) system which detects other vehicles in blind spots on sides that are difficult to see with the left and right side mirrors from the driver's seat and provides guidance or warning to the driver, an Automatic Emergency (AEB) Braking system which automatically operates the vehicle's brake to prevent a collision or mitigate an impact of an accident when a risk of collision with the another vehicle in front is detected while driving, a Lane Keeping Assist System (LKAS) which warns the driver in advance to prevent the vehicle from departing a lane while driving and assists in returning to the lane, an Adaptive Cruise Control (ACC) which helps maintain a distance from the another vehicle in front according to a maximum velocity set by the driver and drive along a center of the lane, a Parking Collision-Avoidance Assist (PCAA) system which warns a potential collision with other vehicles, pedestrians or obstacles at the rear when reversing at low speed and supports emergency braking, and a Smart Parking Assist (SPA) system which automatically controls a steering, a gear shifting, and a vehicle velocity based on searched results for parking spaces using cameras, ultrasonic sensors, etc. to assist drivers in parking and departing are being applied in autonomous vehicles.

Meanwhile, in the recent ADAS market, there is a growing demand for vision-based recognition systems that can operate in real time even on a lean platform that operates with less computational resources.

In particular, as attempts to implement safety and convenience such as an automatic emergency braking system and an adaptive cruise control using only a vision sensor become more active, an improvement in recognition performance based on a single camera is becoming an important task.

However, conventional filtering techniques have technical limitations in inferring high-order physical quantities such as velocity and acceleration based on distance information estimated from the single camera.

That is, minor errors or noises in the estimated distance to an object through analysis of an image captured by the single camera are amplified in calculations of the velocity, the acceleration, etc., which makes it difficult to secure stable physical quantities required for ADAS control.

Therefore, the applicant of the present disclosure proposes a technology that enables stable estimation of the physical quantities such as the velocity and the acceleration from the distance information acquired based on the vision sensor.

SUMMARY OF THE DISCLOSURE

It is an object of the present disclosure to solve all the aforementioned problems.

It is another object of the present disclosure to enable stable estimation of physical quantities such as velocity and acceleration from distance information acquired based on a vision sensor.

It is still another object of the present disclosure to provide stable motion data of an object required for ADAS control from the distance information acquired based on the vision sensor.

The characteristic configurations of the present disclosure for achieving the object of the present disclosure as described above are as follows.

In accordance with one aspect of the present disclosure, there is provided a method for estimating a motion of an object based on a vision sensor, comprising steps of: (a) in response to sequentially acquiring a vision sensor data and a vehicle system data, inputting, by an object motion estimating device, a t-th vision sensor data corresponding to a t-th image frame, which is a current image frame, and a t-th vehicle system data into a data preprocessing module, to thereby instruct the data preprocessing module to preprocess the t-th vision sensor data and the t-th vehicle system data and thus to generate a t-th vector for estimating the motion of the object, wherein the vision sensor data includes a raw object relative distance and an object heading angle, wherein the raw object relative distance is a distance from a vehicle to the object detected through a deep learning based detection model from at least one image captured by at least one camera installed in the vehicle, wherein the object heading angle is a heading angle of the object, and wherein the vehicle system data is related to a data detected from a system of the vehicle; and (b) inputting, by the object motion estimating device, the t-th vector for estimating the motion of the object into a deep learning based sequential regression network, to thereby instruct the sequential regression network to perform a recurrent learning operation on the t-th vector for estimating the motion of the object and thus to generate a t-th prediction object motion data which is a result of predicting the motion of the object corresponding to the t-th image frame.

As one example, further comprising a step of: (c) inputting, by the object motion estimating device, the t-th prediction object motion data and the t-th vehicle system data into a sequential filtering network, to thereby instruct the sequential filtering network to (i) generate, through a state prediction model, a t-th prediction compensation object motion data which is a result of predicting a compensation object motion data in the t-th image frame by applying a learning operation to a (t–1)-th compensation object motion data and the t-th vehicle system data, wherein the (t–1)-th compensation object motion data is a result of compensating a (t–1)-th prediction object motion data in a (t–1)-th image frame by referring to the (t–1)-th prediction object motion data and a (t–1)-th vehicle system data, (ii) generate, through a state vector generation module, a t-th prediction difference state vector based on a difference between the t-th prediction object motion data and the (t–1)-th prediction object motion data, a t-th prediction-compensation difference state vector based on a difference between the t-th prediction object motion data and the t-th prediction compensation object motion data, and a t-th compensation difference state vector based on a difference between the t-th prediction compensation object motion data and the (t–1)-th compensation object motion data, (iii) generate a (t_1)-th uncertainty probability value which is a result of estimating an uncertainty of the t-th prediction compensation object motion data by applying a recurrent operation to the t-th compensation difference state vector through a first filtering model, and generate a (t_2)-th uncertainty probability value which is a result of estimating an uncertainty of the t-th prediction object motion data by applying a recurrent operation to the t-th prediction difference state vector and the t-th prediction-compensation difference state vector through a second filtering model, and (iv) generate a t-th compensation object motion data in the t-th image frame by applying a t-th feedback gain to the t-th prediction-compensation difference state vector and thus by compensating the t-th prediction compensation object motion data, wherein the t-th feedback gain is generated by referring to the (t_1)-th uncertainty probability value and the (t_2)-th uncertainty probability value.

As one example, at the step of (c), the object motion estimating device instructs the sequential filter network to (i) further generate a t-th object distance state vector based on a t-th prediction object relative distance included in the t-th prediction object motion data through the state vector generation module, (ii) generate the (t_1)-th uncertainty probability value which is a result of estimating an uncertainty of the t-th prediction compensation object motion data by applying a recurrent operation to the t-th compensation difference state vector and the t-th object distance state vector through the first filtering model, and (iii) generate the (t_2)-th uncertainty probability value which is a result of estimating an uncertainty of the t-th prediction object motion data by applying a recurrent operation to the t-th prediction difference state vector, the t-th prediction-compensation difference state vector, and the t-th object distance state vector through the second filtering model.

As one example, at the step of (c), the t-th vehicle system data includes a t-th vehicle velocity which is a velocity of the vehicle in the t-th image frame, a t-th vehicle acceleration which is an acceleration of the vehicle in the t-th image frame, a t-th vehicle yaw rate which is a yaw rate of the vehicle in the t-th image frame, and a t-th time difference which is a difference between a time at which the (t–1)-th image frame is acquired and a time at which the t-th image frame is acquired.

As one example, at the step of (c), the state prediction model is composed of an exercise model including at least one of a constant velocity model and a constant acceleration model.

As one example, at the step of (c), each of the first filtering model and the second filtering model is composed of one of an RNN (Recurrent Neural Network), an LSTM (Long Short-Term Memory), and a GRU (Gated Recurrent Unit).

As one example, at the step of (a), the object motion estimating device instructs the data preprocessing module to generate, as the t-th vector for estimating the motion of the object, a t-th vector for estimating the relative distance of the object, a t-th vector for estimating an absolute velocity of the object, and a t-th vector for estimating an absolute acceleration of the object by referring to the t-th vision sensor data and the t-th vehicle system data, wherein the t-th vector for estimating the relative distance of the object includes a t-th data for estimating the relative distance of the object, wherein the t-th vector for estimating the absolute velocity of the object includes a t-th data for estimating the absolute velocity of the object, and wherein the t-th vector for estimating the absolute acceleration of the object includes a t-th data for estimating the absolute acceleration of the object, and wherein, at the step of (b), the object motion estimating device instructs the sequential regression network to (i) generate a t-th prediction object relative distance which is a result of predicting the relative distance of the object with respect to the vehicle in the t-th image frame by applying a recurrent operation to the t-th vector for estimating the relative distance of the object through an object relative distance estimating model, (ii) generate a t-th prediction object absolute velocity which is a result of predicting the absolute velocity of the object in the t-th image frame by applying a recurrent operation to the t-th vector for estimating the absolute velocity of the object through an object absolute velocity estimating model, (iii) generate a t-th prediction object absolute acceleration which is a result of predicting the absolute acceleration of the object in the t-th image frame by applying a recurrent operation to the t-th vector for estimating the absolute acceleration of the object through an object absolute acceleration estimating model, and thus (iv) generate the t-th prediction object motion data which includes the t-th prediction object relative distance, the t-th prediction object absolute velocity, and the t-th prediction object absolute acceleration.

As one example, at the step of (a), the object motion estimating device instructs the data preprocessing module to generate the t-th vector for estimating the motion of the object which includes at least part of a t-th raw object relative distance, a t-th raw object relative velocity which is a relative velocity of the object with respect to the vehicle in the t-th image frame, a t-th raw object absolute velocity which is an absolute velocity of the object in the t-th image frame, a t-th vehicle velocity which is a velocity of the vehicle in the t-th image frame, a t-th vehicle acceleration which is an acceleration of the vehicle in the t-th image frame, a t-th vehicle yaw rate which is a yaw rate of the vehicle in the t-th image frame, a t-th object heading angle, and a t-th time difference which is a difference between a time at which the (t–1)-th image frame is acquired and a time at which the t-th image frame is acquired, and wherein the t-th raw object relative distance, the t-th raw object relative velocity, the t-th raw object absolute velocity, the t-th vehicle velocity, the t-th vehicle acceleration, the t-th vehicle yaw rate, the t-th object heading angle, and the t-th time difference are included in the t-th vision sensor data and the t-th vehicle system data, or are calculated by referring to the t-th vision sensor data and the t-th vehicle system data.

As one example, at the step of (a), the object motion estimating device instructs the data preprocessing module to generate, as the t-th vector for estimating the motion of the object, (i) a t-th vector for estimating the relative distance of the object, (ii) a t-th vector for estimating the absolute velocity of the object, and (iii) a t-th vector for estimating the absolute acceleration of the object, by referring to the t-th vision sensor data and the t-th vehicle system data, wherein the t-th vector for estimating the relative distance of the object includes the t-th raw object relative distance, the t-th raw object relative velocity, the t-th object heading angle, and the t-th time difference, wherein the t-th vector for estimating the absolute velocity of the object includes the t-th raw object relative distance, the t-th raw object absolute velocity, the t-th vehicle velocity, the t-th vehicle yaw rate, the t-th object heading angle, and the t-th time difference, and wherein the t-th vector for estimating the absolute acceleration of the object includes the t-th raw object relative distance, the t-th raw object absolute velocity, the t-th vehicle velocity, the t-th vehicle acceleration, the t-th vehicle yaw rate, the t-th object heading angle, and the t-th time difference, and wherein, at the step of (b), the object motion estimating device instructs the sequential regression network to (i) generate a t-th prediction object relative distance which is a result of predicting the relative distance of the object with respect to the vehicle in the t-th image frame by applying a recurrent operation to the t-th vector for estimating the relative distance of the object through an object relative distance estimating model, (ii) generate a t-th prediction object absolute velocity which is a result of predicting the absolute velocity of the object in the t-th image frame by applying a recurrent operation to the t-th vector for estimating the absolute velocity of the object through an object absolute velocity estimating model, (iii) generate a t-th prediction object absolute acceleration which is a result of predicting the absolute acceleration of the object in the t-th image frame by applying a recurrent operation to the t-th vector for estimating the absolute acceleration of the object through an object absolute acceleration estimating model, and thus (iv) generate the t-th prediction object motion data which includes the t-th prediction object relative distance, the t-th prediction object absolute velocity, and the t-th prediction object absolute acceleration.

As one example, at the step of (a), the object motion estimating device instructs the data preprocessing module to generate the t-th vector for estimating the motion of the object, such that each of the t-th vector for estimating the relative distance of the object, the t-th vector for estimating the absolute velocity of the object, and the t-th vector for estimating the absolute acceleration of the object further includes a t-th vehicle pitch which is a pitch of the vehicle in the t-th image frame, and a t-th vehicle roll which is a roll of the vehicle in the t-th image frame.

As one example, at the step of (b), the sequential regression network is composed of one of an RNN (Recurrent Neural Network), an LSTM (Long Short-Term Memory), and a GRU (Gated Recurrent Unit).

In accordance with another aspect of the present disclosure there is provided an object motion estimating device for estimating a motion of an object based on a vision sensor, comprising: at least one memory which saves instructions for estimating the motion of the object based on the vision sensor; and at least one processor configured to execute an operation for estimating the motion of the object based on the vision sensor according to the instructions saved in the memory to perform processes of: (I) in response to sequentially acquiring a vision sensor data and a vehicle system data, inputting a t-th vision sensor data corresponding to a t-th image frame, which is a current image frame, and a t-th vehicle system data into a data preprocessing module, to thereby instruct the data preprocessing module to preprocess the t-th vision sensor data and the t-th vehicle system data and thus to generate a t-th vector for estimating the motion of the object, wherein the vision sensor data includes a raw object relative distance and an object heading angle, wherein the raw object relative distance is a distance from a vehicle to the object detected through a deep learning based detection model from at least one image captured by at least one camera installed in the vehicle, wherein the object heading angle is a heading angle of the object, and wherein the vehicle system data is related to a data detected from a system of the vehicle; and (II) inputting the t-th vector for estimating the motion of the object into a deep learning based sequential regression network, to thereby instruct the sequential regression network to perform a recurrent learning operation on the t-th vector for estimating the motion of the object and thus to generate a t-th prediction object motion data which is a result of predicting the motion of the object corresponding to the t-th image frame.

As one example, the processor further performing a process of: (III) inputting the t-th prediction object motion data and the t-th vehicle system data into a sequential filtering network, to thereby instruct the sequential filtering network to (i) generate, through a state prediction model, a t-th prediction compensation object motion data which is a result of predicting a compensation object motion data in the t-th image frame by applying a learning operation to a (t−1)-th compensation object motion data and the t-th vehicle system data, wherein the (t−1)-th compensation object motion data is a result of compensating a (t−1)-th prediction object motion data in a (t−1)-th image frame by referring to the (t−1)-th prediction object motion data and a (t−1)-th vehicle system data, (ii) generate, through a state vector generation module, a t-th prediction difference state vector based on a difference between the t-th prediction object motion data and the (t−1)-th prediction object motion data, a t-th prediction-compensation difference state vector based on a difference between the t-th prediction object motion data and the t-th prediction compensation object motion data, and a t-th compensation difference state vector based on a difference between the t-th prediction compensation object motion data and the (t−1)-th compensation object motion data, (iii) generate a $(t\_1)$-th uncertainty probability value which is a result of estimating an uncertainty of the t-th prediction compensation object motion data by applying a recurrent operation to the t-th compensation difference state vector through a first filtering model, and generate a $(t\_2)$-th uncertainty probability value which is a result of estimating an uncertainty of the t-th prediction object motion data by applying a recurrent operation to the t-th prediction difference state vector and the t-th prediction-compensation difference state vector through a second filtering model, and (iv) generate a t-th compensation object motion data in the t-th image frame by applying a t-th feedback gain to the t-th prediction-compensation difference state vector and thus by compensating the t-th prediction compensation object motion data, wherein the t-th feedback gain is generated by referring to the $(t\_1)$-th uncertainty probability value and the $(t\_2)$-th uncertainty probability value.

As one example, at the process of (III), the processor instructs the sequential filter network to (i) further generate a t-th object distance state vector based on a t-th prediction object relative distance included in the t-th prediction object motion data through the state vector generation module, (ii) generate the $(t\_1)$-th uncertainty probability value which is a result of estimating an uncertainty of the t-th prediction compensation object motion data by applying a recurrent operation to the t-th compensation difference state vector and the t-th object distance state vector through the first filtering model, and (iii) generate the (t_2)-th uncertainty probability value which is a result of estimating an uncertainty of the t-th prediction object motion data by applying a recurrent operation to the t-th prediction difference state vector, the t-th prediction-compensation difference state vector, and the t-th object distance state vector through the second filtering model.

As one example, at the process of (III), the t-th vehicle system data includes a t-th vehicle velocity which is a velocity of the vehicle in the t-th image frame, a t-th vehicle acceleration which is an acceleration of the vehicle in the t-th image frame, a t-th vehicle yaw rate which is a yaw rate of the vehicle in the t-th image frame, and a t-th time difference which is a difference between a time at which the (t−1)-th image frame is acquired and a time at which the t-th image frame is acquired.

As one example, at the process of (III), the state prediction model is composed of an exercise model including at least one of a constant velocity model and a constant acceleration model.

As one example, at the process of (III), each of the first filtering model and the second filtering model is composed of one of an RNN (Recurrent Neural Network), an LSTM (Long Short-Term Memory), and a GRU (Gated Recurrent Unit).

As one example, at the process of (I), the processor instructs the data preprocessing module to generate, as the t-th vector for estimating the motion of the object, a t-th vector for estimating the relative distance of the object, a t-th vector for estimating an absolute velocity of the object, and a t-th vector for estimating an absolute acceleration of the object by referring to the t-th vision sensor data and the t-th vehicle system data, wherein the t-th vector for estimating the relative distance of the object includes a t-th data for estimating the relative distance of the object, wherein the t-th vector for estimating the absolute velocity of the object includes a t-th data for estimating the absolute velocity of the object, and wherein the t-th vector for estimating the absolute acceleration of the object includes a t-th data for estimating the absolute acceleration of the object, and wherein, at the process of (II), the processor instructs the sequential regression network to (i) generate a t-th prediction object relative distance which is a result of predicting the relative distance of the object with respect to the vehicle in the t-th image frame by applying a recurrent operation to the t-th vector for estimating the relative distance of the object through an object relative distance estimating model, (ii) generate a t-th prediction object absolute velocity which is a result of predicting the absolute velocity of the object in the t-th image frame by applying a recurrent operation to the t-th vector for estimating the absolute velocity of the object through an object absolute velocity estimating model, (iii) generate a t-th prediction object absolute acceleration which is a result of predicting the absolute acceleration of the object in the t-th image frame by applying a recurrent operation to the t-th vector for estimating the absolute acceleration of the object through an object absolute acceleration estimating model, and thus (iv) generate the t-th prediction object motion data which includes the t-th prediction object relative distance, the t-th prediction object absolute velocity, and the t-th prediction object absolute acceleration.

As one example, at the process of (I), the processor instructs the data preprocessing module to generate the t-th vector for estimating the motion of the object which includes at least part of a t-th raw object relative distance, a t-th raw object relative velocity which is a relative velocity of the object with respect to the vehicle in the t-th image frame, a t-th raw object absolute velocity which is an absolute velocity of the object in the t-th image frame, a t-th vehicle velocity which is a velocity of the vehicle in the t-th image frame, a t-th vehicle acceleration which is an acceleration of the vehicle in the t-th image frame, a t-th vehicle yaw rate which is a yaw rate of the vehicle in the t-th image frame, a t-th object heading angle, and a t-th time difference which is a difference between a time at which the (t−1)-th image frame is acquired and a time at which the t-th image frame is acquired, and wherein the t-th raw object relative distance, the t-th raw object relative velocity, the t-th raw object absolute velocity, the t-th vehicle velocity, the t-th vehicle acceleration, the t-th vehicle yaw rate, the t-th object heading angle, and the t-th time difference are included in the t-th vision sensor data and the t-th vehicle system data, or are calculated by referring to the t-th vision sensor data and the t-th vehicle system data.

As one example, at the process of (I), the processor instructs the data preprocessing module to generate, as the t-th vector for estimating the motion of the object, (i) a t-th vector for estimating the relative distance of the object, (ii) a t-th vector for estimating the absolute velocity of the object, and (iii) a t-th vector for estimating the absolute acceleration of the object, by referring to the t-th vision sensor data and the t-th vehicle system data, wherein the t-th vector for estimating the relative distance of the object includes the t-th raw object relative distance, the t-th raw object relative velocity, the t-th object heading angle, and the t-th time difference, wherein the t-th vector for estimating the absolute velocity of the object includes the t-th raw object relative distance, the t-th raw object absolute velocity, the t-th vehicle velocity, the t-th vehicle yaw rate, the t-th object heading angle, and the t-th time difference, and wherein the t-th vector for estimating the absolute acceleration of the object includes the t-th raw object relative distance, the t-th raw object absolute velocity, the t-th vehicle velocity, the t-th vehicle acceleration, the t-th vehicle yaw rate, the t-th object heading angle, and the t-th time difference, and wherein, at the process of (II), the processor instructs the sequential regression network to (i) generate a t-th prediction object relative distance which is a result of predicting the relative distance of the object with respect to the vehicle in the t-th image frame by applying a recurrent operation to the t-th vector for estimating the relative distance of the object through an object relative distance estimating model, (ii) generate a t-th prediction object absolute velocity which is a result of predicting the absolute velocity of the object in the t-th image frame by applying a recurrent operation to the t-th vector for estimating the absolute velocity of the object through an object absolute velocity estimating model, (iii) generate a t-th prediction object absolute acceleration which is a result of predicting the absolute acceleration of the object in the t-th image frame by applying a recurrent operation to the t-th vector for estimating the absolute acceleration of the object through an object absolute acceleration estimating model, and thus (iv) generate the t-th prediction object motion data which includes the t-th prediction object relative distance, the t-th prediction object absolute velocity, and the t-th prediction object absolute acceleration.

As one example, at the process of (I), the processor instructs the data preprocessing module to generate the t-th vector for estimating the motion of the object, such that each of the t-th vector for estimating the relative distance of the object, the t-th vector for estimating the absolute velocity of the object, and the t-th vector for estimating the absolute acceleration of the object further includes a t-th vehicle pitch which is a pitch of the vehicle in the t-th image frame, and a t-th vehicle roll which is a roll of the vehicle in the t-th image frame.

As one example, at the process of (II), the sequential regression network is composed of one of an RNN (Recurrent Neural Network), an LSTM (Long Short-Term Memory), and a GRU (Gated Recurrent Unit).

BRIEF DESCRIPTION OF THE DRAWINGS

The accompanying drawings used to explain example embodiments of the present disclosure are only part of example embodiments of the present disclosure and other drawings may be obtained based on the drawings by those skilled in the art of the present disclosure without inventive work.

FIG. 3 is a drawing schematically illustrating a method for estimating the motion of the object based on the vision sensor in accordance with one example embodiment of the present disclosure.

DETAILED DESCRIPTION

Figure 1:
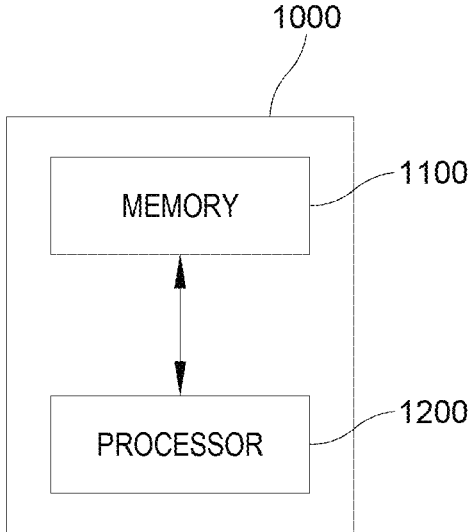
FIG. 1 is a drawing schematically illustrating an object motion estimating device for estimating a motion of an object based on a vision sensor in accordance with one example embodiment of the present disclosure.

In the following detailed description, reference is made to the accompanying drawings that show, by way of illustration, specific embodiments in which the invention may be practiced. These embodiments are described in sufficient detail to enable those skilled in the art to practice the invention. It is to be understood that the various embodiments of the present invention, although different, are not necessarily mutually exclusive. For example, a particular feature, structure, or characteristic described herein in connection with one embodiment may be implemented within other embodiments without departing from the spirit and scope of the present invention. In addition, it is to be understood that the position or arrangement of individual elements within each disclosed embodiment may be modified without departing from the spirit and scope of the present invention. The following detailed description is, therefore, not to be taken in a limiting sense, and the scope of the present invention is defined only by the appended claims, appropriately interpreted, along with the full range of equivalents to which the claims are entitled. In the drawings, like numerals refer to the same or similar functionality throughout the several views.

To allow those skilled in the art to the present disclosure to be carried out easily, the example embodiments of the present disclosure by referring to attached diagrams will be explained in detail as shown below.

FIG. 1 is a drawing schematically illustrating an object motion estimating device for estimating a motion of an object based on a vision sensor in accordance with one example embodiment of the present disclosure. By referring to FIG. 1, the object motion estimating device 1000 may comprise a memory 1100 and a processor 1200 for executing operations of estimating the motion of the object based on the vision sensor according to the instructions saved in the memory 1100.

Specifically, the object motion estimating device 1000 may achieve a desired system performance by using combinations of at least one computing device and at least one computer software, e.g., a computer processor, a memory, a storage, an input device, an output device, or any other conventional computing components, an electronic communication device such as a router or a switch, an electronic information storage system such as a network-attached storage (NAS) device and a storage area network (SAN) as the computing device and any instructions that allow the computing device to function in a specific way as the computer software.

Also, the processor 1200 of the object motion estimating device 1000 may include a hardware configuration of MPU (Micro Processing Unit) or CPU (Central Processing Unit), cache memory, data bus, etc. Additionally, any OS (operating system) and software configuration of applications that achieve specific purposes may further be included.

However, it does not exclude the case of the object motion estimating device 1000 including an integrated processor which is an integrated form of the medium, the processor, and the memory for performing the present disclosure.

Meanwhile, the processor 1200 of the object motion estimating device 1000 may execute the instructions saved in the memory 1100 to perform processes of, in response to sequentially acquiring vision sensor data and vehicle system data, inputting a t-th vision sensor data corresponding to a t-th image frame, which is a current image frame, and a t-th vehicle system data into a data preprocessing module, to thereby instruct the data preprocessing module to preprocess the t-th vision sensor data and the t-th vehicle system data and thus to generate a t-th vector for estimating the motion of the object, wherein the vision sensor data includes a raw object relative distance and an object heading angle, wherein the raw object relative distance is a distance from a vehicle to the object detected through a deep learning based detection model from at least one image captured by at least one camera installed in the vehicle, wherein the object heading angle is a heading angle of the object, and wherein the vehicle system data is related to data detected from a system of the vehicle. Also, the processor 1200 of the object motion estimating device 1000 may execute the instructions stored in the memory 1100 to perform processes of, inputting the t-th vector for estimating the motion of the object into a deep learning based sequential regression network, to thereby instruct the sequential regression network to perform a recurrent learning operation on the t-th vector for estimating the motion of the object and thus to generate a t-th prediction object motion data which is a result of predicting the motion of the object corresponding to the t-th image frame.

In addition, the processor 1200 of the object motion estimating device 1000 may execute the instructions saved in the memory 1100 to further perform processes of, inputting the t-th prediction object motion data and the t-th vehicle system data into a sequential filtering network, to thereby instruct the sequential filtering network to (i) generate, through a state prediction model, a t-th prediction compensation object motion data which is a result of predicting a compensation object motion data in the t-th image frame by applying a learning operation to a (t−1)-th compensation object motion data and the t-th vehicle system data, wherein the (t−1)-th compensation object motion data is a result of compensating a (t−1)-th prediction object motion data in a (t−1)-th image frame by referring to the (t−1)-th prediction object motion data and a (t−1)-th vehicle system data, (ii) generate, through a state vector generation module, a t-th prediction difference state vector based on a difference between the t-th prediction object motion data and the (t−1)-th prediction object motion data, a t-th prediction-compensation difference state vector based on a difference between the t-th prediction object motion data and the t-th prediction compensation object motion data, and a t-th compensation difference state vector based on a difference between the t-th prediction compensation object motion data and the (t−1)-th compensation object motion data, (iii) generate a (t_1)-th uncertainty probability value which is a result of estimating an uncertainty of the t-th prediction compensation object motion data by applying a recurrent operation to the t-th compensation difference state vector through a first filtering model, and generate a (t_2)-th uncertainty probability value which is a result of estimating an uncertainty of the t-th prediction object motion data by applying a recurrent operation to the t-th prediction difference state vector and the t-th prediction-compensation difference state vector through a second filtering model, and (iv) generate a t-th compensation object motion data in the t-th image frame by applying a t-th feedback gain to the t-th prediction-compensation difference state vector and thus by compensating the t-th prediction compensation object motion data, wherein the t-th feedback gain is generated by referring to the (t_1)-th uncertainty probability value and the (t_2)-th uncertainty probability value.

The method for estimating the motion of the object based on the vision sensor with the object motion estimating device 1000 configured as above will be described in more detail by referring to FIG. 2 and FIG. 3 as follows.

First, the object motion estimating device 1000 may sequentially acquire the vision sensor data and the vehicle system data at a step of S110. Herein, (i) the vision sensor data includes the raw object relative distance and an object heading angle, (ii) the raw object relative distance is the distance from the vehicle to the object detected through the deep learning based detection model from at least one image captured by at least one camera installed in the vehicle, (iii) the object heading angle is the heading angle of the object, and (iv) the vehicle system data is related to a data detected from the system of the vehicle.

Herein, the detection model may be a deep learning model trained to detect the object from the image captured by a camera installed in the vehicle, and output a bounding box, class information, the raw object relative distance, and the object heading angle of the detected object. Also, various training methods may be used for training the detection model, such as a training method for supervised training which uses a training image in which the bounding box, the class information, the raw object relative distance, and the object heading angle of the object are annotated, a training method for training by fusing sensing information such as radar and lidar with the training image, and a training method for training which uses training data having continuous image frames.

Also, the detection model may be a deep learning model trained to detect 3D objects in 2D images captured by a monocular camera installed in the vehicle, and output the bounding box, the class information, the raw object relative distance, and the object heading angle of the detected object. Also, various training methods may be used for training the detection model, such as a training method for training which uses the training image in which the 3D object information corresponding to the 2D image is annotated, and a training method for training which uses lidar sensing information, i.e., lidar image.

Meanwhile, in the above, the vision sensor data is obtained by training a conventional detection model (which detects the object and outputs the bounding box and class information of the object) such that the conventional detection model can additionally output the raw object relative distance and the object heading angle. However, by referring to the results of outputting the bounding box and the class information of the object through the conventional detection model, the vision sensor data can also be acquired by using a separate deep learning model having been trained to track the object in continuous image frames and estimate the raw object relative distance and the object heading angle.

Next, the object motion estimating device 1000 may preprocess the t-th vision sensor data and the t-th vehicle system data, and thus generate a t-th vector for estimating the motion of the object at a step of S120. Herein the t-th vision sensor data corresponds to the t-th image frame.

That is, the object motion estimating device 1000 may input the t-th vision sensor data corresponding to the t-th image frame, which is a current image frame, and the t-th vehicle system data (acquired from the sequentially acquired vision sensor data and the vehicle system data) into the data preprocessing module 1300, to thereby instruct the data preprocessing module 1300 to preprocess the t-th vision sensor data and the t-th vehicle system data and thus to generate the t-th vector for estimating the motion of the object.

Figure 4:
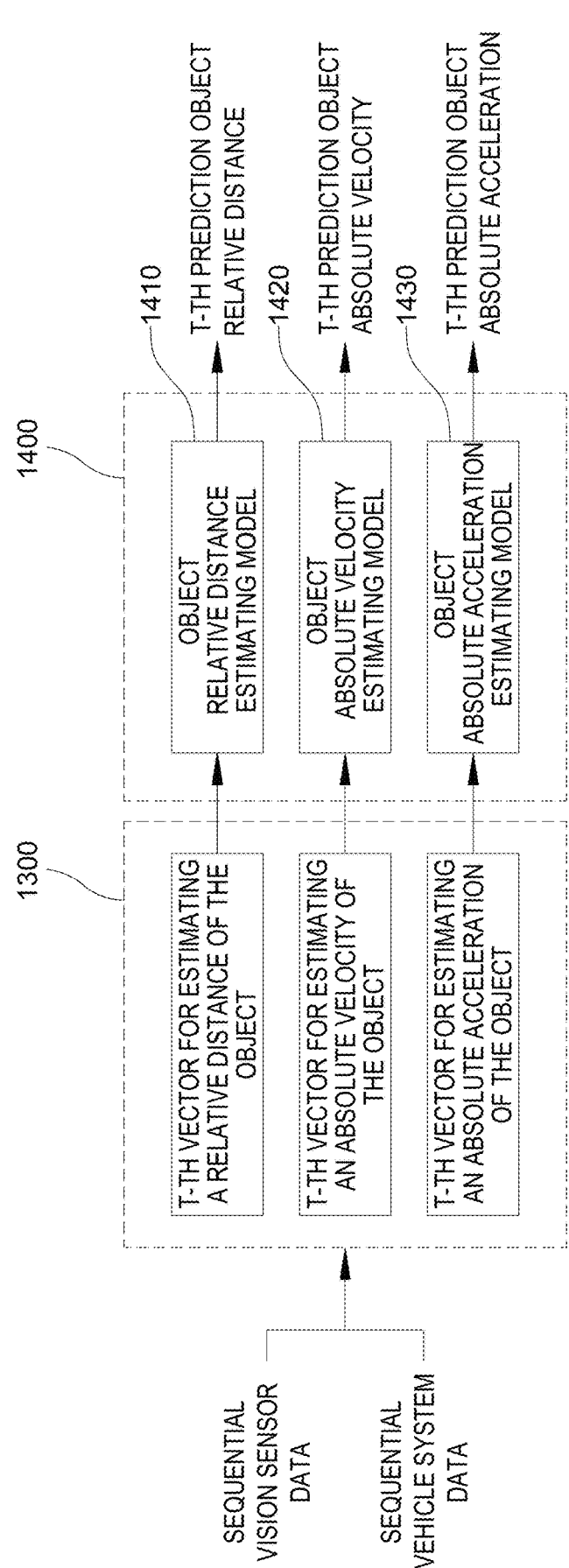
FIG. 4 is a drawing schematically illustrating detailed processes of data preprocessing and generating a t-th prediction object motion data in the method for estimating the motion of the object based on the vision sensor in accordance with one example embodiment of the present disclosure.

For example, by referring to FIG. 4, the object motion estimating device 1000 may instruct the data preprocessing module 1300 to generate, as the t-th vector for estimating the motion of the object, a t-th vector for estimating the relative distance of the object, a t-th vector for estimating an absolute velocity of the object, and a t-th vector for estimating an absolute acceleration of the object by referring to the t-th vision sensor data and the t-th vehicle system data, wherein the t-th vector for estimating the relative distance of the object includes a t-th data for estimating the relative distance of the object, wherein the t-th vector for estimating the absolute velocity of the object includes a t-th data for estimating the absolute velocity of the object, and wherein the t-th vector for estimating the absolute acceleration of the object includes a t-th data for estimating the absolute acceleration of the object.

Meanwhile, the object motion estimating device 1000 may instruct the data preprocessing module 1300 to generate the t-th vector for estimating the motion of the object which includes at least part of a t-th raw object relative distance, a t-th raw object relative velocity which is a relative velocity of the object with respect to the vehicle in the t-th image frame, a t-th raw object absolute velocity which is an absolute velocity of the object in the t-th image frame, a t-th vehicle velocity which is a velocity of the vehicle in the t-th image frame, a t-th vehicle acceleration which is an acceleration of the vehicle in the t-th image frame, a t-th vehicle yaw rate which is a yaw rate of the vehicle in the t-th image frame, a t-th object heading angle, and a t-th time difference which is a difference between a time at which the (t−1)-th image frame is acquired and a time at which the t-th image frame is acquired. Herein, the t-th raw object relative distance, the t-th raw object relative velocity, the t-th raw object absolute velocity, the t-th vehicle velocity, the t-th vehicle yaw rate, the t-th object heading angle and the t-th time difference may be included in the t-th vision sensor data and the t-th vehicle system data, or may be calculated by referring to the t-th vision sensor data and the t-th vehicle system data. Also, the distance, the velocity, and the acceleration related to the object or the vehicle may be scalar values representing a distance, a velocity, and an acceleration, or may be vector values further including directionality, in accordance with one example embodiment of the present disclosure.

For example, the object motion estimating device 1000 may instruct the data preprocessing module 1300 to generate, as the t-th vector for estimating the motion of the object, (i) a t-th vector for estimating the relative distance of the object, (ii) a t-th vector for estimating the absolute velocity of the object, and (iii) a t-th vector for estimating the absolute acceleration of the object, by referring to the t-th vision sensor data and the t-th vehicle system data, wherein the t-th vector for estimating the relative distance of the object includes the t-th raw object relative distance, the t-th raw object relative velocity, the t-th object heading angle, and the t-th time difference, wherein the t-th vector for estimating the absolute velocity of the object includes the t-th raw object relative distance, the t-th raw object absolute velocity, the t-th vehicle velocity, the t-th vehicle yaw rate, the t-th object heading angle, and the t-th time difference, and wherein the t-th vector for estimating the absolute acceleration of the object includes the t-th raw object relative distance, the t-th raw object absolute velocity, the t-th vehicle velocity, the t-th vehicle acceleration, the t-th vehicle yaw rate, the t-th object heading angle, and the t-th time difference.

Also, the object motion estimating device 1000 may instruct the data preprocessing module 1300 to generate the t-th vector for estimating the motion of the object, such that each of the t-th vector for estimating the relative distance of the object, the t-th vector for estimating the absolute velocity of the object, and the t-th vector for estimating the absolute acceleration of the object further includes a t-th vehicle pitch which is a pitch of the vehicle in the t-th image frame, and a t-th vehicle roll which is a roll of the vehicle in the t-th image frame. Herein, the pitch and the roll of the vehicle may be acquired by using the vehicle system data detected through an acceleration sensor, an inclination sensor, an angular velocity sensor of the vehicle, etc., or by analyzing the continuous image frames captured by the camera.

Figure 2:
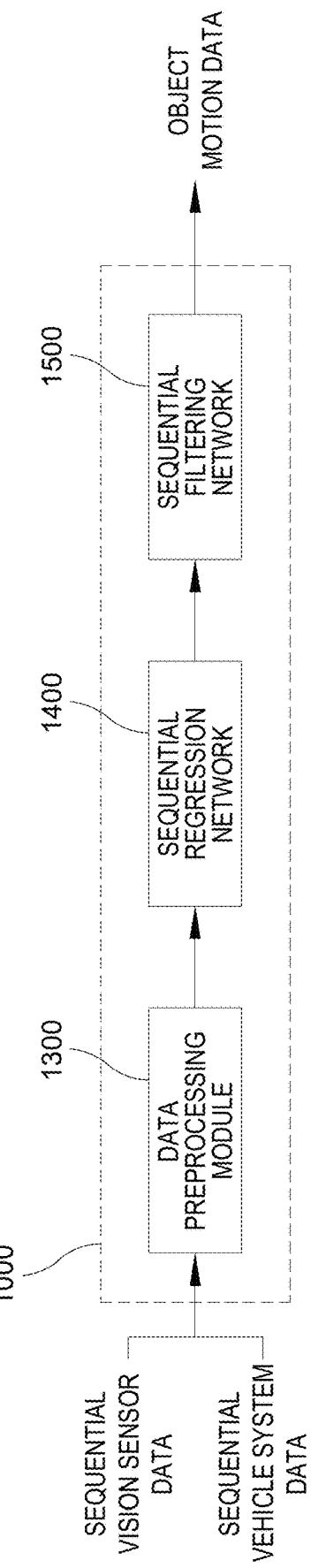
FIG. 2 is a drawing schematically illustrating a configuration of a deep learning network of the object motion estimating device for estimating the motion of the object based on the vision sensor in accordance with one example embodiment of the present disclosure.

Next, by referring to FIG. 2 and FIG. 3 again, the object motion estimating device 1000 may perform a recurrent operation on the t-th vector for estimating the motion of the object and thus generate a t-th prediction object motion data corresponding to the t-th image frame at a step of S130.

That is, the object motion estimating device 1000 may input the t-th vector for estimating the motion of the object into a deep learning based sequential regression network 1400, to thereby instruct the sequential regression network 1400 to perform a recurrent learning operation on the t-th vector for estimating the motion of the object and thus to generate a t-th prediction object motion data which is a result of predicting the motion of the object corresponding to the t-th image frame.

For example, by referring to FIG. 4 again, the object motion estimating device 1000 may instruct the sequential regression network 1400 to (i) generate a t-th prediction object relative distance which is a result of predicting the relative distance of the object with respect to the vehicle in the t-th image frame by applying a recurrent operation to the t-th vector for estimating the relative distance of the object through an object relative distance estimating model 1410, (ii) generate a t-th prediction object absolute velocity which is a result of predicting the absolute velocity of the object in the t-th image frame by applying a recurrent operation to the t-th vector for estimating the absolute velocity of the object through an object absolute velocity estimating model 1420, (iii) generate a t-th prediction object absolute acceleration which is a result of predicting the absolute acceleration of the object in the t-th image frame by applying a recurrent operation to the t-th vector for estimating the absolute acceleration of the object through an object absolute acceleration estimating model 1430, and thus (iv) generate a t-th prediction object motion data which includes the t-th prediction object relative distance, the t-th prediction object absolute velocity, and the t-th prediction object absolute acceleration.

Herein, the sequential regression network 1400, i.e., each of the object relative distance estimating model 1410, the object absolute velocity estimating model 1420, and the object absolute acceleration estimating model 1430 included in the sequential regression network 1400, may be configured as one of an RNN (Recurrent Neural Network), an LSTM (Long Short-Term Memory), and a GRU (Gated Recurrent Unit).

Figure 5:
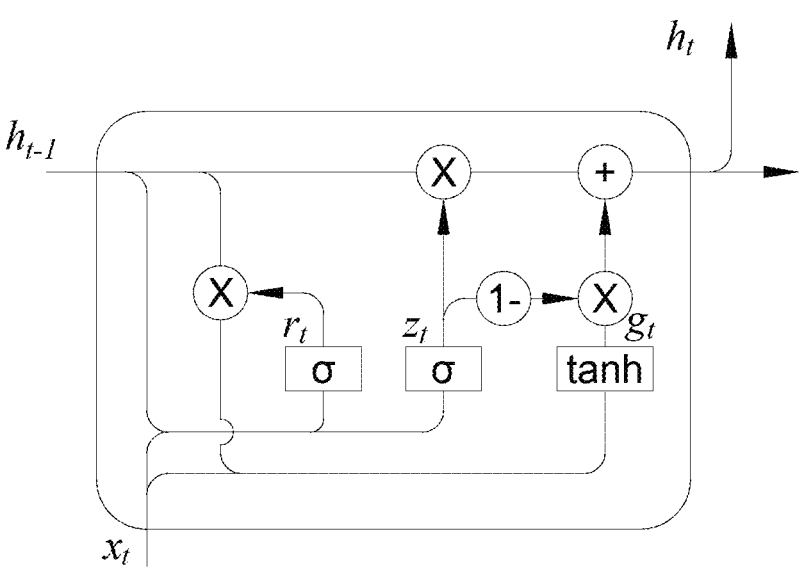
FIG. 5 is a drawing exemplarily illustrating a deep learning model used for estimating the motion of the object in the method for estimating the motion of the object based on the vision sensor in accordance with one example embodiment of the present disclosure.

For example, FIG. 5 exemplarily illustrates an example of a case in which the sequential regression network 1400 is configured with the GRU 1450 as a model for processing the sequential data.

In response to inputting the t-th vector $x_t$ for estimating the motion of the object generated by the data preprocessing module, a reset gate $r_t$ of the GRU 1450 performs an FC (Fully Connected) operation on the t-th vector $x_t$ for estimating the motion of the object and the previous hidden state $h_{t-1}$ to thereby determine the current state, i.e., to determine how much of the previous state is maintained in the t-th vector for estimating the motion of the object. This can be expressed in a formula as follows.

$$r_t = \sigma(W_{xr}x_t + W_{hr}h_{t-1} + b_r)$$

In the above mathematical formula, is the current state weight parameter of the FC layer that performs the FC operation of the reset gate $r_t$, $W_{hr}$ is the previous state weight parameter of the FC layer, and $b_r$ is a bias parameter of the FC layer.

Also, an update gate $Z_t$ of the GRU 1450 performs an FC (Fully Connected) operation on the t-th vector $x_t$ for estimating the motion of the object and the previous hidden state $h_{t-1}$ to determine a balance between the previous state information, i.e., the previous hidden state, with the new information, i.e., the t-th vector for estimating the motion of the object, when the previous state information and the new information are combined with each other. This can be expressed in a formula as follows.

$$z_t = \sigma(W_{xz}x_t + W_{hz}h_{t-1} + b_z)$$

In the above mathematical formula, $W_{xz}$ is a current state weight parameter of the FC layer that performs the FC operation of the update gate $Z_t$, $W_{hz}$ is the previous state weight parameter of the FC layer, and $b_z$ is a bias parameter of the FC layer.

Herein, $z_t$ determines an application ratio of the previous information, and accordingly, an application ratio of the current information can be determined by $1-z_t$.

Thereafter, GRU 1450 can compute the hidden state by applying both the reset gate $r_t$ and the update gate $Z_t$.

That is, first, a candidate hidden state $g_t$ is generated by multiplying the previous information by the result of the reset gate $r_t$, wherein the candidate hidden state $g_t$ is a selected information to be exported among the previous information as an output $h_t$, and then, a tan h function is applied to the candidate hidden state $g_t$ to thereby convert the value into a range between −1 and 1. Next, the information to be exported among the current information is acquired by multiplying the result of applying the tan h function and an application ratio $1-z_t$ (at which the current information is to be applied) obtained from the update gate $Z_t$, and the information to be exported among the previous information is acquired by multiplying the previous information $h_{t-1}$ and an application ratio $z_t$ of the previous information obtained from the update gate $Z_t$. Thereafter, the calculated current information to be exported and the calculated previous information to be exported are combined to thereby acquire the hidden state $h_t$ to be finally exported as the output, i.e., the t-th prediction object motion data. This can be expressed in a formula as follows.

$$g_t = \tan h(W_{xg}x_t + W_{hg}(r_t \odot h_{t-1}) + b_g) \quad h_t = z_t \odot h_{t-1} + (1-z_t) \odot g_t$$

In the above mathematical formula, $W_{xg}$ is a current state weight parameter of the FC layer for generating the candidate hidden state $g_t$, $W_{hg}$ is the previous state weight parameter of the FC layer, and $b_g$ is a bias parameter of the FC layer.

Therefore, in accordance with the present disclosure, by regressing the object motion data, i.e., by performing recurrent operation on the vision sensor data and the vehicle system data related to the object detected based on the vision sensor, it is possible to obtain stable physical quantities without minute errors or amplification of noise in the estimated distance to the object obtained through analysis of an image captured by a single camera.

Meanwhile, the object motion data regressed by the above method may have temporal jitter, such as irregular vibration or distortion that may occur in the transmission time of the vision sensor data and the vehicle system data or the transmission cycle of the vision sensor data and the vehicle system data.

Thus, in order to obtain more stable object motion data for use in ADAS, etc., additional compensation can be performed on prediction object motion data predicted through regression.

To this end, the object motion estimating device 1000 may generate a t-th compensation object motion data which is a result of compensating temporal instability of the t-th prediction object motion data by using the t-th prediction object motion data and the t-th vehicle system data at a step of S140.

That is, the object motion estimating device 1000 may input the t-th prediction object motion data and the t-th vehicle system data, outputted from the sequential regression network 1400, into the sequential filtering network 1500, to thereby instruct the sequential filtering network 1500 to perform recurrent operation on the t-th prediction object motion data and the t-th vehicle system data and thus compensate the t-th prediction object motion data, i.e., generate the t-th compensation object motion data, which is a more stable physical quantity.

Figure 6:
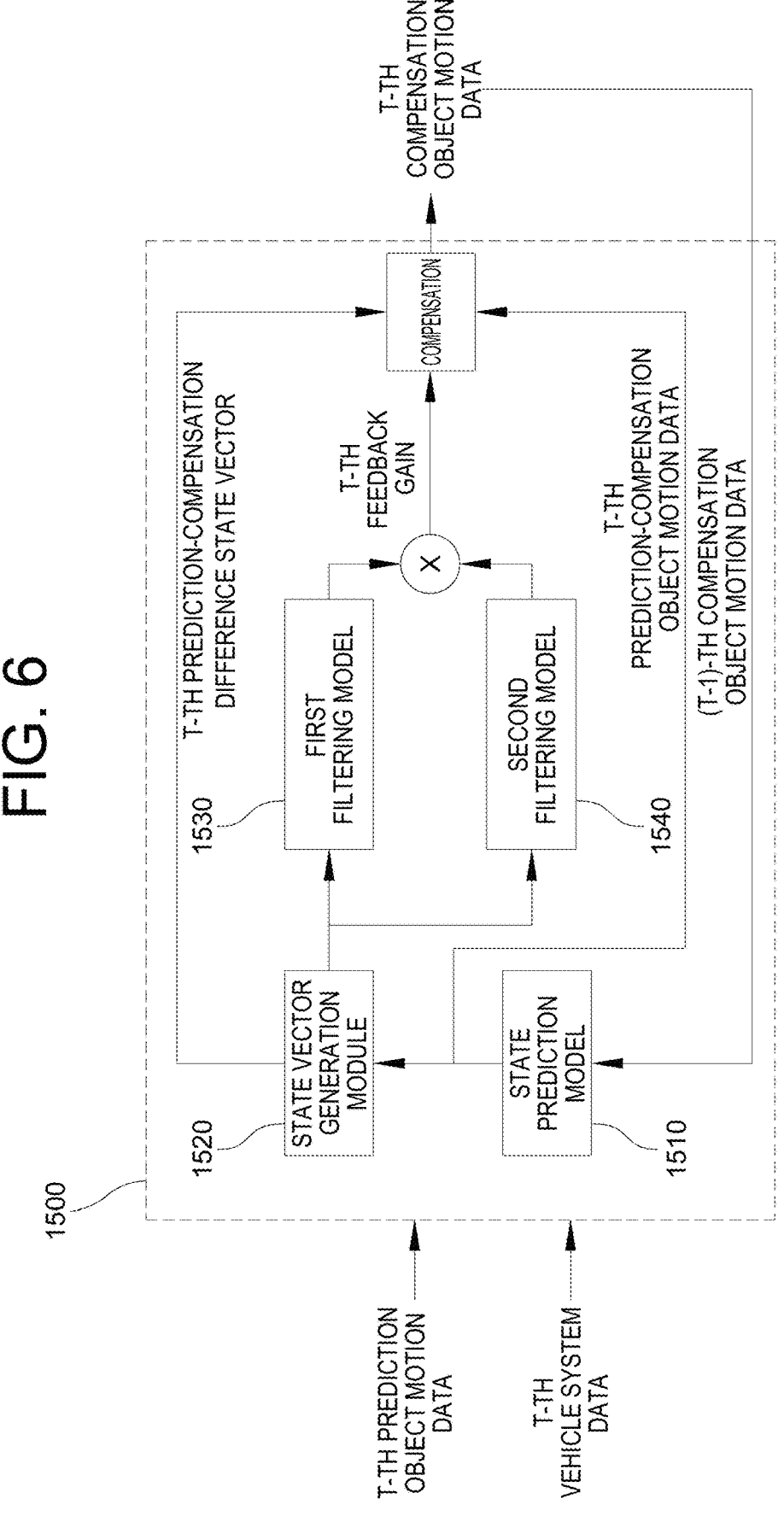
FIG. 6 is a drawing schematically illustrating a process of generating a compensation object motion data by compensating a prediction object motion data in the method for estimating the motion of the object based on the vision sensor in accordance with one example embodiment of the present disclosure.
Figure 7:
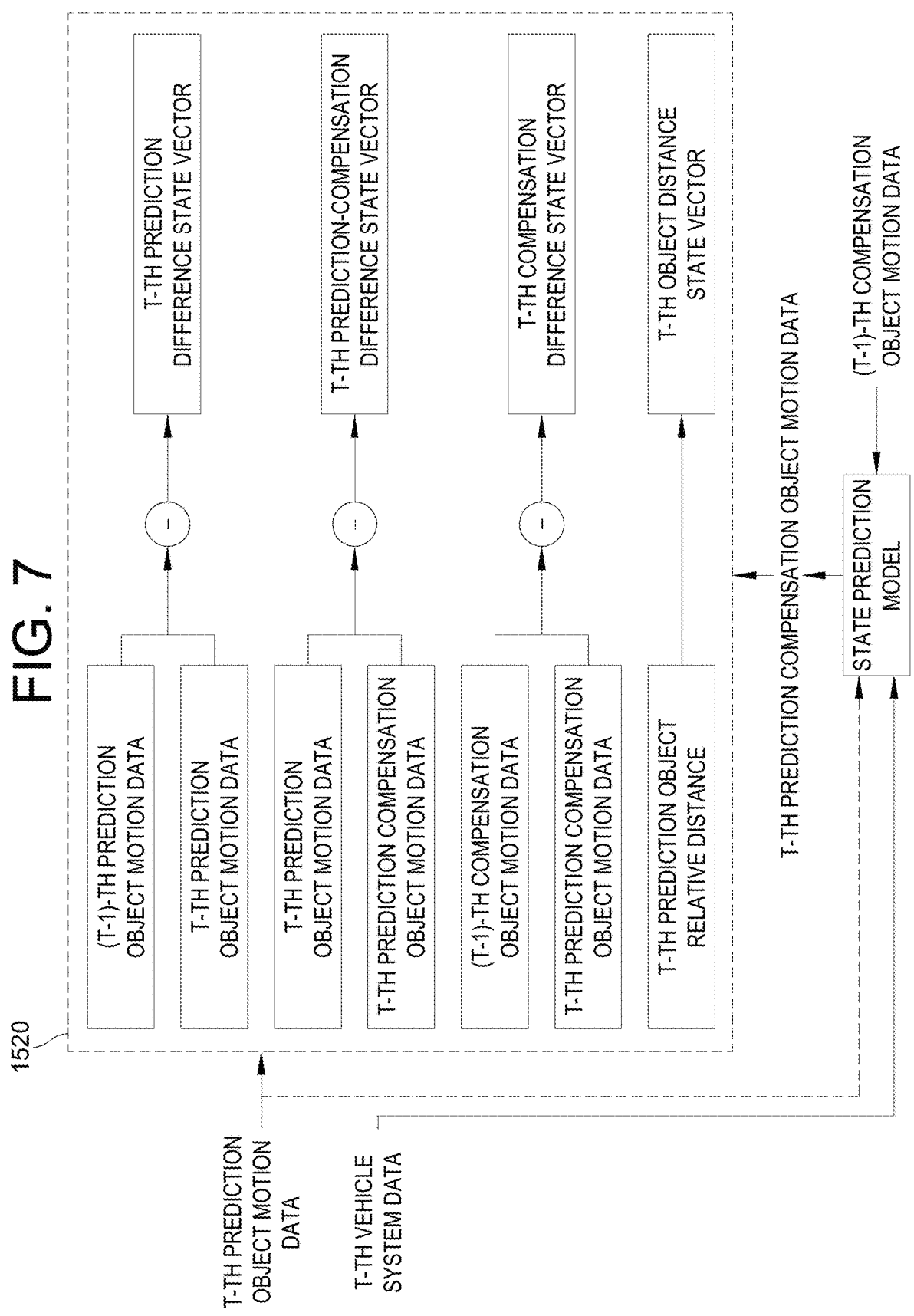
FIG. 7 is a drawing schematically illustrating a process of generating state vectors used in compensating the prediction object motion data in accordance with one example embodiment of the present disclosure.

For example, by referring to FIG. 6 and FIG. 7, the object motion estimating device 1000 may input the t-th prediction object motion data and the t-th vehicle system data into the sequential filtering network 1500, to thereby instruct the sequential filtering network 1500 to generate, through a state prediction model 1510, a t-th prediction compensation object motion data which is a result of predicting a compensation object motion data in the t-th image frame by applying a learning operation to a (t−1)-th compensation object motion data and the t-th vehicle system data, wherein the (t−1)-th compensation object motion data is a result of compensating a (t−1)-th prediction object motion data in a (t−1)-th image frame.

Herein, the (t−1)-th compensation object motion data may be a result of compensating the (t−1)-th prediction object motion data by referring to the (t−1)-th prediction object motion data and the (t−1)-th vehicle system data. Also, the t-th prediction motion data may include a t-th prediction relative distance, a t-th prediction absolute velocity, a t-th prediction absolute acceleration, and the t-th vehicle system data may include a t-th vehicle velocity which is a velocity of the vehicle in the t-th image frame, a t-th vehicle acceleration which is an acceleration of the vehicle in the t-th image frame, a t-th vehicle yaw rate which is a yaw rate of the vehicle in the t-th image frame, and a t-th time difference which is a difference between a time at which the (t−1)-th image frame is acquired and a time at which the t-th image frame is acquired.

Also, the object motion estimating device 1000 may instruct the sequential filtering network 1500 to generate, through the state prediction model 1510, the t-th prediction compensation object motion by applying a learning operation to the (t−1)-th compensation object motion data, the t-th vehicle system data, and a t-th prediction object relative distance which is included in the t-th prediction object motion data.

Meanwhile, the state prediction model may be configured as an exercise model including at least one of a constant velocity model and a constant acceleration model, but the present disclosure is not limited thereto, and may be configured as various motion estimation models that estimate the motion of the object from the image frames based on deep learning.

Also, the object motion estimating device 1000 may instruct the sequential filtering network 1500 to generate, through a state vector generation module 1520, a t-th prediction difference state vector based on a difference between the t-th prediction object motion data and the (t−1)-th prediction object motion data, a t-th prediction-compensation difference state vector based on a difference between the t-th prediction object motion data and the t-th prediction compensation object motion data, and a t-th compensation difference state vector based on a difference between the t-th prediction compensation object motion data and the (t−1)-th compensation object motion data.

Thereafter, the object motion estimating device 1000 may instruct the sequential filtering network 1500 to generate a (t_1)-th uncertainty probability value which is a result of estimating an uncertainty of the t-th prediction compensation object motion data by applying a recurrent operation to the t-th compensation difference state vector through a first filtering model 1530, and generate a (t_2)-th uncertainty probability value which is a result of estimating an uncertainty of the t-th prediction object motion data by applying a recurrent operation to the t-th prediction difference state vector and the t-th prediction-compensation difference state vector through a second filtering model 1540. Herein, each of the first filtering model and the second filtering model may be configured as one of an RNN (Recurrent Neural Network), an LSTM (Long Short-Term Memory), and a GRU (Gated Recurrent Unit).

Meanwhile, the object motion estimating device 1000 may instruct the sequential filtering network 1500 to further generate a t-th object distance state vector based on a t-th prediction object relative distance included in the t-th prediction object motion data through the state vector generation module 1520, generate the (t_1)-th uncertainty probability value which is a result of estimating an uncertainty of the t-th prediction compensation object motion data by applying a recurrent operation to the t-th compensation difference state vector and the t-th object distance state vector through the first filtering model 1530, and generate the (t_2)-th uncertainty probability value which is a result of estimating an uncertainty of the t-th prediction object motion data by applying a recurrent operation to the t-th prediction difference state vector, the t-th prediction-compensation difference state vector, and the t-th object distance state vector through the second filtering model 1540.

Then, the object motion estimating device 1000 may instruct the sequential filtering network 1500 to generate a t-th compensation object motion data in the t-th image frame by applying a t-th feedback gain to the t-th prediction-compensation difference state vector and thus by compensating the t-th prediction compensation object motion data, wherein the t-th feedback gain is generated by referring to the (t_1)-th uncertainty probability value and the (t_2)-th uncertainty probability value.

Thus, by removing the temporal jitter of the object motion data regressed in the sequential regression network 1400, more stable object motion data for use in ADAS, etc., can be provided, in accordance with the present disclosure.

Meanwhile, the sequential regression network 1400 and the sequential filtering network 1500 according to the present disclosure can be individually trained by using training data, or trained simultaneously by using an end-to-end method, and training can be performed by supervised learning using the training data.

Figure 8:
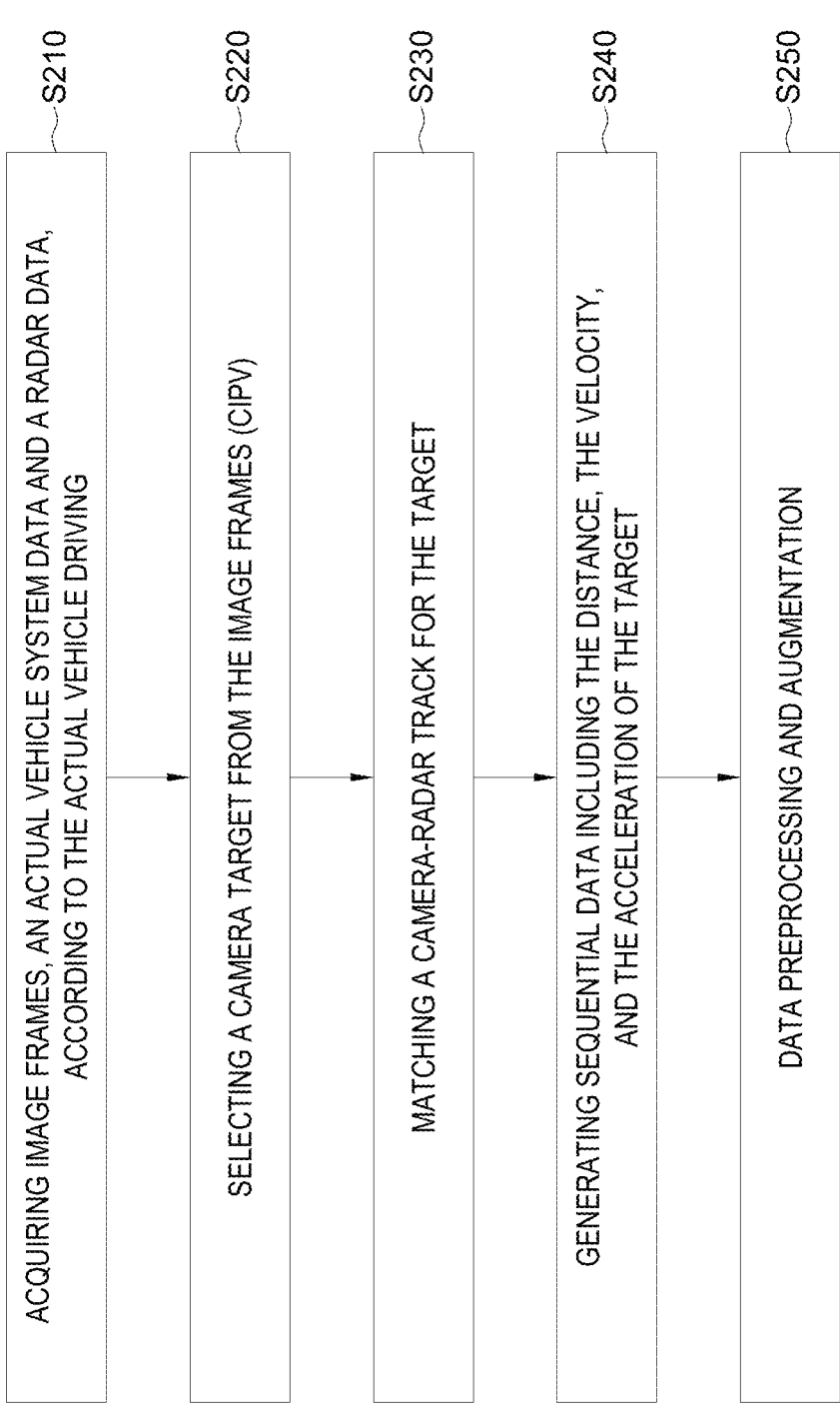
FIG. 8 is a drawing schematically illustrating a process of generating training data for use in training a sequential regression network and a sequential filtering network in accordance with the present disclosure.

The process of generating the training data for using in training the sequential regression network 1400 and the sequential filtering network 1500 according to the present disclosure is described below by referring to FIG. 8.

First, while driving an actual vehicle to collect the training data, images captured from a camera installed in the actual vehicle, i.e., image frames, an actual vehicle system data sensed from sensors installed in the actual vehicle, and a radar data on surrounding objects detected from a radar installed in the actual vehicle can be acquired at a step of S210.

Then, a target can be selected at a step of S220, wherein the target is an object among the objects detected through image analysis of image frames.

Figure 9:
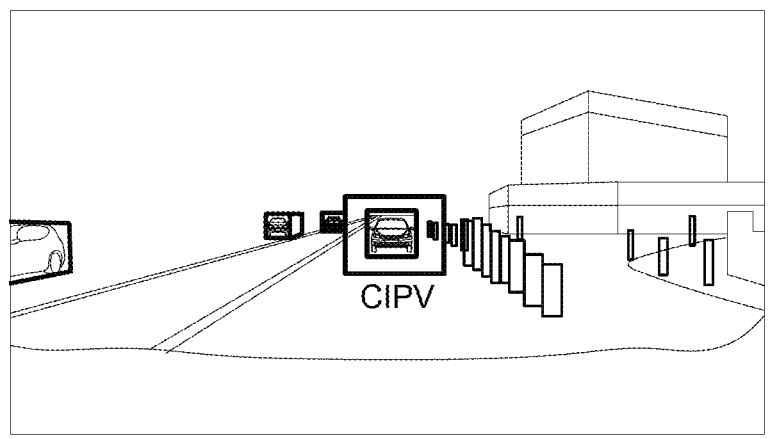
FIG. 9 is a drawing schematically illustrating an example of selecting a target from an image frame in the process of generating the training data for use in training the sequential regression network and the sequential filtering network in accordance with the present disclosure.

Herein, by referring to FIG. 9, the target (CIPV, Closest In path Vehicle) is the closest vehicle on the driving path of the actual vehicle and can be a reference object for ADAS control.

Next, a camera-radar track for the target can be matched at a step of S230.

That is, by synchronizing the image frames captured by the camera and the radar data for the target detected by the radar, the image data and the radar data for the target can be matched on a time axis.

Then, the original sequential data including the distance, the velocity, and the acceleration for the target can be generated based on the actual vehicle system data and the radar data at a step of S240.

Thereafter, data preprocessing and augmentation for the original sequential data may be performed to generate the training data at a step of S250.

That is, the original sequential data may undergo preprocessing processes such as sampling and noise removal, and then various types of data augmentation to improve the generalization performance of the model.

Figure 10:
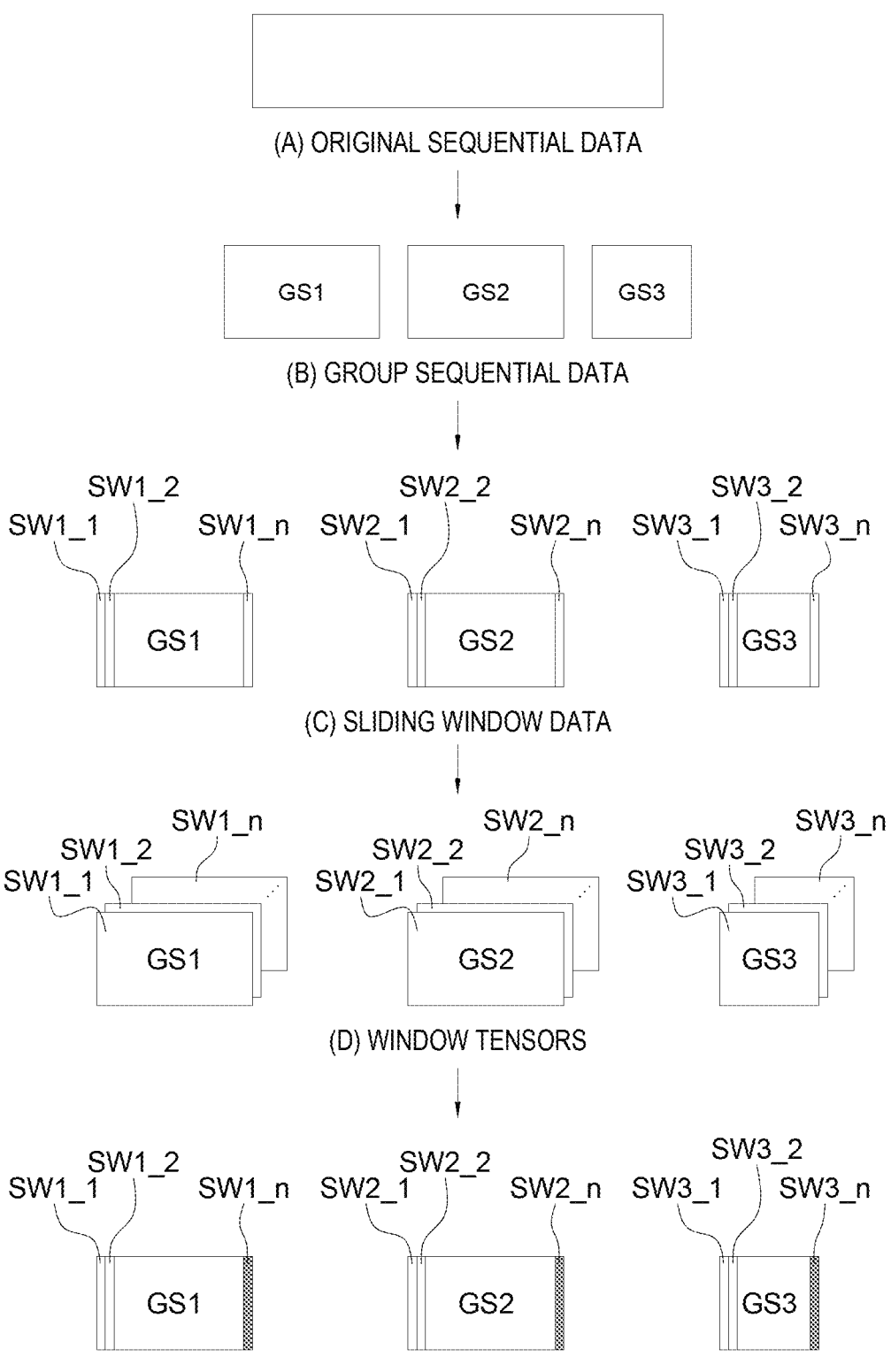
FIG. 10 is a drawing schematically illustrating a state of preprocessing the sequential data in the process of generating the training data for use in training the sequential regression network and the sequential filtering network in accordance with the present disclosure.

As an example, by referring to FIG. 10, (a) in response to an input of the original sequential data, (b) the original sequential data is grouped into a specific cardinal number of sequential data corresponding to image frames within a preset minimum number of image frames and a preset maximum number of image frames, based on the data vectors of the original sequential data, to thereby generate a plurality of grouped sequential data GS1, GS2, GS3. Herein, the number of data included in each of the plurality of sequential data may be the same or different. In addition, in FIG. 10, the number of grouped sequential data GS1, GS2, GS3 is illustrated as three for the convenience of explanation.

Then, (c) by applying the sliding window technique to each of the plurality of the grouped sequential data, each of the plurality of sliding window data SW1_1 to SW3_*n* corresponding to each of the plurality of the grouped sequential data is generated. That is, for one grouped sequential data, a window having a preset time interval is moved in the grouped sequential data, and the part of the grouped sequential data within the window is generated as each sliding window data. Herein, in FIG. 10, the number of sliding window data corresponding to each of the three grouped sequential data is illustrated as having n for the convenience of explanation, thus, the number of the sliding window data generated depending on the number of data included in each of the grouped sequential data may be the same or different.

Thereafter, (d) in response to creating window tensors by converting each of the sliding window data SW1_1 to SW3_*n* into tensor data, a training data set may be created by performing (e) filtering for excluding a sliding window data that do not satisfy a preset minimum number of data or a preset maximum number of data among the plurality of sliding window data SW1_1 to SW3_*n*. Alternatively, the training data set may be created by excluding the sliding window data that do not satisfy the preset minimum number of data or the preset maximum number of data among the plurality of sliding window data SW1_1 to SW3_*n* and then creating the remaining sliding window data as window tensors.

In addition, in order to resolve the imbalance of the distance and the velocity, data included in the plurality of the sequential data may be binned by the distance and the velocity, an average distance value or an average velocity value of the data included in each of the binned groups may be calculated, and the distance or the velocity of the data included in each of the binned groups may be replaced with the calculated average distance value or the calculated average velocity value, to thereby perform data augmentation. In addition, in order to simulate various driving situations, in case there is no object gradually approaching, the data augmentation may be performed to reverse the sign of the velocity and the acceleration of the object gradually moving away or to compensate the heading angle of the object.

The present disclosure has an effect of enabling stable estimation of physical quantities such as the velocity and the acceleration from the distance information acquired based on the vision sensor.

The present disclosure has another effect of providing the stable motion data of the object required for ADAS control from the distance information acquired based on the vision sensor.

The present disclosure has still another effect of operating stably by using the stable velocity and the acceleration of the object estimated from the distance information of the object detected based on the vision sensor.

The embodiments of the present invention as explained above can be implemented in a form of executable program command through a variety of computer means recordable to computer readable media. The computer readable media may include solely or in combination, program commands, data files, and data structures. The program commands recorded to the media may be components specially designed for the present invention or may be usable to a skilled human in a field of computer software. Computer readable media may include magnetic media such as hard disk, floppy disk, and magnetic tape, optical media such as CD-ROM and DVD, magneto-optical media such as floptical disk and hardware devices such as ROM, RAM, and flash memory specially designed to store and carry out program commands. Program commands may include not only a machine language code made by a complier but also a high level code that can be used by an interpreter etc., which is executed by a computer. The aforementioned hardware device may work as more than a software module to perform the action of the present invention and they may do the same in the opposite case.

As seen above, the present invention has been explained by specific matters such as detailed components, limited embodiments, and drawings. They have been provided only to help more general understanding of the present invention. It, however, will be understood by those skilled in the art that various changes and modification may be made from the description without departing from the spirit and scope of the invention as defined in the following claims.

Accordingly, the thought of the present invention must not be confined to the explained embodiments, and the follow-ing patent claims as well as everything including variations equal or equivalent to the patent claims pertain to the category of the thought of the present invention.

What is claimed is:

1. A method for estimating a motion of an object based on a vision sensor, comprising steps of:

(a) in response to sequentially acquiring a vision sensor data and a vehicle system data, inputting, by an object motion estimating device, a t-th vision sensor data corresponding to a t-th image frame, which is a current image frame, and a t-th vehicle system data into a data preprocessing module, to thereby instruct the data preprocessing module to preprocess the t-th vision sensor data and the t-th vehicle system data and thus to generate a t-th vector for estimating the motion of the object, wherein the vision sensor data includes a raw object relative distance and an object heading angle, wherein the raw object relative distance is a distance from a vehicle to the object detected through a deep learning based detection model from at least one image captured by at least one camera installed in the vehicle, wherein the object heading angle is a heading angle of the object, and wherein the vehicle system data is related to a data detected from a system of the vehicle;

(b) inputting, by the object motion estimating device, the t-th vector for estimating the motion of the object into a deep learning based sequential regression network, to thereby instruct the sequential regression network to perform a recurrent learning operation on the t-th vector for estimating the motion of the object and thus to generate a t-th prediction object motion data which is a result of predicting the motion of the object corresponding to the t-th image frame; and (c) inputting, by the object motion estimating device, the t-th prediction object motion data and the t-th vehicle system data into a sequential filtering network, to thereby instruct the sequential filtering network to (i) generate, through a state prediction model, a t-th prediction compensation object motion data which is a result of predicting a compensation object motion data in the t-th image frame by applying a learning operation to a (t−1)-th compensation object motion data and the t-th vehicle system data, wherein the (t−1)-th compensation object motion data is a result of compensating a (t−1)-th prediction object motion data in a (t−1)-th image frame by referring to the (t−1)-th prediction object motion data and a (t−1)-th vehicle system data, (ii) generate, through a state vector generation module, a t-th prediction difference state vector based on a difference between the t-th prediction object motion data and the (t−1)-th prediction object motion data, a t-th prediction-compensation difference state vector based on a difference between the t-th prediction object motion data and the t-th prediction compensation object motion data, and a t-th compensation difference state vector based on a difference between the t-th prediction compensation object motion data and the (t−1)-th compensation object motion data, (iii) generate a (t_1)-th uncertainty probability value which is a result of estimating an uncertainty of the t-th prediction compensation object motion data by applying a recurrent operation to the t-th compensation difference state vector through a first filtering model, and generate a (t_2)-th uncertainty probability value which is a result of estimating an uncertainty of the t-th prediction object motion data by applying a recurrent operation to the t-th prediction difference state vector and the t-th prediction-compensation difference state vector through a second filtering model, and (iv) generate a t-th compensation object motion data in the t-th image frame by applying a t-th feedback gain to the t-th prediction-compensation difference state vector and thus by compensating the t-th prediction compensation object motion data, wherein the t-th feedback gain is generated by referring to the (t_1)-th uncertainty probability value and the (t_2)-th uncertainty probability value.

2. The method of claim 1, wherein, at the step of (c), the object motion estimating device instructs the sequential filter network to (i) further generate a t-th object distance state vector based on a t-th prediction object relative distance included in the t-th prediction object motion data through the state vector generation module, (ii) generate the (t_1)-th uncertainty probability value which is a result of estimating an uncertainty of the t-th prediction compensation object motion data by applying a recurrent operation to the t-th compensation difference state vector and the t-th object distance state vector through the first filtering model, and (iii) generate the (t_2)-th uncertainty probability value which is a result of estimating an uncertainty of the t-th prediction object motion data by applying a recurrent operation to the t-th prediction difference state vector, the t-th prediction-compensation difference state vector, and the t-th object distance state vector through the second filtering model.

3. The method of claim 1, wherein, at the step of (c), the t-th vehicle system data includes a t-th vehicle velocity which is a velocity of the vehicle in the t-th image frame, a t-th vehicle acceleration which is an acceleration of the vehicle in the t-th image frame, a t-th vehicle yaw rate which is a yaw rate of the vehicle in the t-th image frame, and a t-th time difference which is a difference between a time at which the (t−1)-th image frame is acquired and a time at which the t-th image frame is acquired.

4. The method of claim 1, wherein, at the step of (c), the state prediction model comprises an exercise model including at least one of a constant velocity model and a constant acceleration model.

5. The method of claim 1, wherein, at the step of (c), each of the first filtering model and the second filtering model comprises one of an RNN (Recurrent Neural Network), an LSTM (Long Short-Term Memory), and a GRU (Gated Recurrent Unit).

6. A method for estimating a motion of an object based on a vision sensor, comprising steps of:

(a) in response to sequentially acquiring a vision sensor data and a vehicle system data, inputting, by an object motion estimating device, a t-th vision sensor data corresponding to a t-th image frame, which is a current image frame, and a t-th vehicle system data into a data preprocessing module, to thereby instruct the data preprocessing module to preprocess the t-th vision sensor data and the t-th vehicle system data and thus to generate a t-th vector for estimating the motion of the object, wherein the vision sensor data includes a raw object relative distance and an object heading angle, wherein the raw object relative distance is a distance from a vehicle to the object detected through a deep learning based detection model from at least one image captured by at least one camera installed in the vehicle, wherein the object heading angle is a heading angle of the object, and wherein the vehicle system data is related to a data detected from a system of the vehicle; and (b) inputting, by the object motion estimating device, the t-th vector for estimating the motion of the object into a deep learning based sequential regression network, to thereby instruct the sequential regression network to perform a recurrent learning operation on the t-th vector for estimating the motion of the object and thus to generate a t-th prediction object motion data which is a result of predicting the motion of the object corresponding to the t-th image frame;

wherein, at the step of (a), the object motion estimating device instructs the data preprocessing module to generate, as the t-th vector for estimating the motion of the object, a t-th vector for estimating a relative distance of the object, a t-th vector for estimating an absolute velocity of the object, and a t-th vector for estimating an absolute acceleration of the object by referring to the t-th vision sensor data and the t-th vehicle system data, wherein the t-th vector for estimating the relative distance of the object includes a t-th data for estimating the relative distance of the object, wherein the t-th vector for estimating the absolute velocity of the object includes a t-th data for estimating the absolute velocity of the object, and wherein the t-th vector for estimating the absolute acceleration of the object includes a t-th data for estimating the absolute acceleration of the object; and wherein, at the step of (b), the object motion estimating device instructs the sequential regression network to (i) generate a t-th prediction object relative distance which is a result of predicting the relative distance of the object with respect to the vehicle in the t-th image frame by applying a recurrent operation to the t-th vector for estimating the relative distance of the object through an object relative distance estimating model, (ii) generate a t-th prediction object absolute velocity which is a result of predicting the absolute velocity of the object in the t-th image frame by applying a recurrent operation to the t-th vector for estimating the absolute velocity of the object through an object absolute velocity estimating model, (iii) generate a t-th prediction object absolute acceleration which is a result of predicting the absolute acceleration of the object in the t-th image frame by applying a recurrent operation to the t-th vector for estimating the absolute acceleration of the object through an object absolute acceleration estimating model, and thus (iv) generate the t-th prediction object motion data which includes the t-th prediction object relative distance, the t-th prediction object absolute velocity, and the t-th prediction object absolute acceleration.

7. A method for estimating a motion of an object based on a vision sensor, comprising steps of:

(a) in response to sequentially acquiring a vision sensor data and a vehicle system data, inputting, by an object motion estimating device, a t-th vision sensor data corresponding to a t-th image frame, which is a current image frame, and a t-th vehicle system data into a data preprocessing module, to thereby instruct the data preprocessing module to preprocess the t-th vision sensor data and the t-th vehicle system data and thus to generate a t-th vector for estimating the motion of the object, wherein the vision sensor data includes a raw object relative distance and an object heading angle, wherein the raw object relative distance is a distance from a vehicle to the object detected through a deep learning based detection model from at least one image captured by at least one camera installed in the vehicle, wherein the object heading angle is a heading angle of the object, and wherein the vehicle system data is related to a data detected from a system of the vehicle; and (b) inputting, by the object motion estimating device, the t-th vector for estimating the motion of the object into a deep learning based sequential regression network, to thereby instruct the sequential regression network to perform a recurrent learning operation on the t-th vector for estimating the motion of the object and thus to generate a t-th prediction object motion data which is a result of predicting the motion of the object corresponding to the t-th image frame;

wherein, at the step of (a), the object motion estimating device instructs the data preprocessing module to generate the t-th vector for estimating the motion of the object which includes at least part of a t-th raw object relative distance, a t-th raw object relative velocity which is a relative velocity of the object with respect to the vehicle in the t-th image frame, a t-th raw object absolute velocity which is an absolute velocity of the object in the t-th image frame, a t-th vehicle velocity which is a velocity of the vehicle in the t-th image frame, a t-th vehicle acceleration which is an acceleration of the vehicle in the t-th image frame, a t-th vehicle yaw rate which is a yaw rate of the vehicle in the t-th image frame, a t-th object heading angle, and a t-th time difference which is a difference between a time at which a (t−1)-th image frame is acquired and a time at which the t-th image frame is acquired; and wherein the t-th raw object relative distance, the t-th raw object relative velocity, the t-th raw object absolute velocity, the t-th vehicle velocity, the t-th vehicle acceleration, the t-th vehicle yaw rate, the t-th object heading angle, and the t-th time difference are included in the t-th vision sensor data and the t-th vehicle system data, or are calculated by referring to the t-th vision sensor data and the t-th vehicle system data.

8. The method of claim 7, wherein, at the step of (a), object motion estimating device instructs the data preprocessing module to generate, as the t-th vector for estimating the motion of the object, (i) a t-th vector for estimating a relative distance of the object, (ii) a t-th vector for estimating the absolute velocity of the object, and (iii) a t-th vector for estimating an absolute acceleration of the object, by referring to the t-th vision sensor data and the t-th vehicle system data, wherein the t-th vector for estimating the relative distance of the object includes the t-th raw object relative distance, the t-th raw object relative velocity, the t-th object heading angle, and the t-th time difference, wherein the t-th vector for estimating the absolute velocity of the object includes the t-th raw object relative distance, the t-th raw object absolute velocity, the t-th vehicle velocity, the t-th vehicle yaw rate, the t-th object heading angle, and the t-th time difference, and wherein the t-th vector for estimating the absolute acceleration of the object includes the t-th raw object relative distance, the t-th raw object absolute velocity, the t-th vehicle velocity, the t-th vehicle acceleration, the t-th vehicle yaw rate, the t-th object heading angle, and the t-th time difference; and wherein, at the step of (b), the object motion estimating device instructs the sequential regression network to (i) generate a t-th prediction object relative distance which is a result of predicting the relative distance of the object with respect to the vehicle in the t-th image frame by applying a recurrent operation to the t-th vector for estimating the relative distance of the object through an object relative distance estimating model, (ii) generate a t-th prediction object absolute velocity which is a result of predicting the absolute velocity of the object in the t-th image frame by applying a recurrent operation to the t-th vector for estimating the absolute velocity of the object through an object absolute velocity estimating model, (iii) generate a t-th prediction object absolute acceleration which is a result of predicting the absolute acceleration of the object in the t-th image frame by applying a recurrent operation to the t-th vector for estimating the absolute acceleration of the object through an object absolute acceleration estimating model, and thus (iv) generate the t-th prediction object motion data which includes the t-th prediction object relative distance, the t-th prediction object absolute velocity, and the t-th prediction object absolute acceleration.

9. The method of claim 8, wherein, at the step of (a), the object motion estimating device instructs the data preprocessing module to generate the t-th vector for estimating the motion of the object, such that each of the t-th vector for estimating the relative distance of the object, the t-th vector for estimating the absolute velocity of the object, and the t-th vector for estimating the absolute acceleration of the object further includes a t-th vehicle pitch which is a pitch of the vehicle in the t-th image frame, and a t-th vehicle roll which is a roll of the vehicle in the t-th image frame.

10. The method of claim 1, wherein, at the step of (b), the sequential regression network comprises one of an RNN (Recurrent Neural Network), an LSTM (Long Short-Term Memory), and a GRU (Gated Recurrent Unit).

11. An object motion estimating device for estimating a motion of an object based on a vision sensor, comprising:

at least one memory which saves instructions for estimating the motion of the object based on the vision sensor; and at least one processor configured to execute an operation for estimating the motion of the object based on the vision sensor according to the instructions saved in the memory to perform processes of: (I) in response to sequentially acquiring a vision sensor data and a vehicle system data, inputting a t-th vision sensor data corresponding to a t-th image frame, which is a current image frame, and a t-th vehicle system data into a data preprocessing module, to thereby instruct the data preprocessing module to preprocess the t-th vision sensor data and the t-th vehicle system data and thus to generate a t-th vector for estimating the motion of the object, wherein the vision sensor data includes a raw object relative distance and an object heading angle, wherein the raw object relative distance is a distance from a vehicle to the object detected through a deep learning based detection model from at least one image captured by at least one camera installed in the vehicle, wherein the object heading angle is a heading angle of the object, and wherein the vehicle system data is related to a data detected from a system of the vehicle; (II) inputting the t-th vector for estimating the motion of the object into a deep learning based sequential regression network, to thereby instruct the sequential regression network to perform a recurrent learning operation on the t-th vector for estimating the motion of the object and thus to generate a t-th prediction object motion data which is a result of predicting the motion of the object corresponding to the t-th image frame; and (III) inputting the t-th prediction object motion data and the t-th vehicle system data into a sequential filtering network, to thereby instruct the sequential filtering network to (i) generate, through a state prediction model, a t-th prediction compensation object motion data which is a result of predicting a compensation object motion data in the t-th image frame by applying a learning operation to a (t−1)-th compensation object motion data and the t-th vehicle system data, wherein the (t−1)-th compensation object motion data is a result of compensating a (t−1)-th prediction object motion data in a (t−1)-th image frame by referring to the (t−1)-th prediction object motion data and a (t−1)-th vehicle system data, (ii) generate, through a state vector generation module, a t-th prediction difference state vector based on a difference between the t-th prediction object motion data and the (t−1)-th prediction object motion data, a t-th prediction-compensation difference state vector based on a difference between the t-th prediction object motion data and the t-th prediction compensation object motion data, and a t-th compensation difference state vector based on a difference between the t-th prediction compensation object motion data and the (t−1)-th compensation object motion data, (iii) generate a (t_1)-th uncertainty probability value which is a result of estimating an uncertainty of the t-th prediction compensation object motion data by applying a recurrent operation to the t-th compensation difference state vector through a first filtering model, and generate a (t_2)-th uncertainty probability value which is a result of estimating an uncertainty of the t-th prediction object motion data by applying a recurrent operation to the t-th prediction difference state vector and the t-th prediction-compensation difference state vector through a second filtering model, and (iv) generate a t-th compensation object motion data in the t-th image frame by applying a t-th feedback gain to the t-th prediction-compensation difference state vector and thus by compensating the t-th prediction compensation object motion data, wherein the t-th feedback gain is generated by referring to the (t_1)-th uncertainty probability value and the (t_2)-th uncertainty probability value.

12. The object motion estimating device of claim 11, wherein, at the process of (III), the processor instructs the sequential filter network to (i) further generate a t-th object distance state vector based on a t-th prediction object relative distance included in the t-th prediction object motion data through the state vector generation module, (ii) generate the (t_1)-th uncertainty probability value which is a result of estimating an uncertainty of the t-th prediction compensation object motion data by applying a recurrent operation to the t-th compensation difference state vector and the t-th object distance state vector through the first filtering model, and (iii) generate the (t_2)-th uncertainty probability value which is a result of estimating an uncertainty of the t-th prediction object motion data by applying a recurrent operation to the t-th prediction difference state vector, the t-th prediction-compensation difference state vector, and the t-th object distance state vector through the second filtering model.

13. The object motion estimating device of claim 11, wherein, at the process of (III), the t-th vehicle system data includes a t-th vehicle velocity which is a velocity of the vehicle in the t-th image frame, a t-th vehicle acceleration which is an acceleration of the vehicle in the t-th image frame, a t-th vehicle yaw rate which is a yaw rate of the vehicle in the t-th image frame, and a t-th time difference which is a difference between a time at which the (t−1)-th image frame is acquired and a time at which the t-th image frame is acquired.

14. The object motion estimating device of claim 11, wherein, at the process of (III), the state prediction model comprises an exercise model including at least one of a constant velocity model and a constant acceleration model.

15. The object motion estimating device of claim 11, wherein, at the process of (III), each of the first filtering model and the second filtering model comprises one of an RNN (Recurrent Neural Network), an LSTM (Long Short-Term Memory), and a GRU (Gated Recurrent Unit).

16. An object motion estimating device for estimating a motion of an object based on a vision sensor, comprising:

at least one memory which saves instructions for estimating the motion of the object based on the vision sensor; and at least one processor configured to execute an operation for estimating the motion of the object based on the vision sensor according to the instructions saved in the memory to perform processes of: (I) in response to sequentially acquiring a vision sensor data and a vehicle system data, inputting a t-th vision sensor data corresponding to a t-th image frame, which is a current image frame, and a t-th vehicle system data into a data preprocessing module, to thereby instruct the data preprocessing module to preprocess the t-th vision sensor data and the t-th vehicle system data and thus to generate a t-th vector for estimating the motion of the object, wherein the vision sensor data includes a raw object relative distance and an object heading angle, wherein the raw object relative distance is a distance from a vehicle to the object detected through a deep learning based detection model from at least one image captured by at least one camera installed in the vehicle, wherein the object heading angle is a heading angle of the object, and wherein the vehicle system data is related to a data detected from a system of the vehicle; and (II) inputting the t-th vector for estimating the motion of the object into a deep learning based sequential regression network, to thereby instruct the sequential regression network to perform a recurrent learning operation on the t-th vector for estimating the motion of the object and thus to generate a t-th prediction object motion data which is a result of predicting the motion of the object corresponding to the t-th image frame;

wherein, at the process of (I), the processor instructs the data preprocessing module to generate, as the t-th vector for estimating the motion of the object, a t-th vector for estimating a relative distance of the object, a t-th vector for estimating an absolute velocity of the object, and a t-th vector for estimating an absolute acceleration of the object by referring to the t-th vision sensor data and the t-th vehicle system data, wherein the t-th vector for estimating the relative distance of the object includes a t-th data for estimating the relative distance of the object, wherein the t-th vector for estimating the absolute velocity of the object includes a t-th data for estimating the absolute velocity of the object, and wherein the t-th vector for estimating the absolute acceleration of the object includes a t-th data for estimating the absolute acceleration of the object; and wherein, at the process of (II), the processor instructs the sequential regression network to (i) generate a t-th prediction object relative distance which is a result of predicting the relative distance of the object with respect to the vehicle in the t-th image frame by applying a recurrent operation to the t-th vector for estimating the relative distance of the object through an object relative distance estimating model, (ii) generate a t-th prediction object absolute velocity which is a result of predicting the absolute velocity of the object in the t-th image frame by applying a recurrent operation to the t-th vector for estimating the absolute velocity of the object through an object absolute velocity estimating model, (iii) generate a t-th prediction object absolute acceleration which is a result of predicting the absolute acceleration of the object in the t-th image frame by applying a recurrent operation to the t-th vector for estimating the absolute acceleration of the object through an object absolute acceleration estimating model, and thus (iv) generate the t-th prediction object motion data which includes the t-th prediction object relative distance, the t-th prediction object absolute velocity, and the t-th prediction object absolute acceleration.

17. An object motion estimating device for estimating a motion of an object based on a vision sensor, comprising:
  at least one memory which saves instructions for estimating the motion of the object based on the vision sensor; and
  at least one processor configured to execute an operation for estimating the motion of the object based on the vision sensor according to the instructions saved in the memory to perform processes of: (I) in response to sequentially acquiring a vision sensor data and a vehicle system data, inputting a t-th vision sensor data corresponding to a t-th image frame, which is a current image frame, and a t-th vehicle system data into a data preprocessing module, to thereby instruct the data preprocessing module to preprocess the t-th vision sensor data and the t-th vehicle system data and thus to generate a t-th vector for estimating the motion of the object, wherein the vision sensor data includes a raw object relative distance and an object heading angle, wherein the raw object relative distance is a distance from a vehicle to the object detected through a deep learning based detection model from at least one image captured by at least one camera installed in the vehicle, wherein the object heading angle is a heading angle of the object, and wherein the vehicle system data is related to a data detected from a system of the vehicle; and (II) inputting the t-th vector for estimating the motion of the object into a deep learning based sequential regression network, to thereby instruct the sequential regression network to perform a recurrent learning operation on the t-th vector for estimating the motion of the object and thus to generate a t-th prediction object motion data which is a result of predicting the motion of the object corresponding to the t-th image frame; and wherein, at the process of (I), the processor instructs the data preprocessing module to generate the t-th vector for estimating the motion of the object which includes at least part of a t-th raw object relative distance, a t-th raw object relative velocity which is a relative velocity of the object with respect to the vehicle in the t-th image frame, a t-th raw object absolute velocity which is an absolute velocity of the object in the t-th image frame, a t-th vehicle velocity which is a velocity of the vehicle in the t-th image frame, a t-th vehicle acceleration which is an acceleration of the vehicle in the t-th image frame, a t-th vehicle yaw rate which is a yaw rate of the vehicle in the t-th image frame, a t-th object heading angle, and a t-th time difference which is a difference between a time at which a (t−1)-th image frame is acquired and a time at which the t-th image frame is acquired, and wherein the t-th raw object relative distance, the t-th raw object relative velocity, the t-th raw object absolute velocity, the t-th vehicle velocity, the t-th vehicle acceleration, the t-th vehicle yaw rate, the t-th object heading angle, and the t-th time difference are included in the t-th vision sensor data and the t-th vehicle system data, or are calculated by referring to the t-th vision sensor data and the t-th vehicle system data.

18. The object motion estimating device of claim 17, wherein, at the process of (I), the processor instructs the data preprocessing module to generate, as the t-th vector for estimating the motion of the object, (i) a t-th vector for estimating a relative distance of the object, (ii) a t-th vector for estimating the absolute velocity of the object, and (iii) a t-th vector for estimating an absolute acceleration of the object, by referring to the t-th vision sensor data and the t-th vehicle system data, wherein the t-th vector for estimating the relative distance of the object includes the t-th raw object relative distance, the t-th raw object relative velocity, the t-th object heading angle, and the t-th time difference, wherein the t-th vector for estimating the absolute velocity of the object includes the t-th raw object relative distance, the t-th raw object absolute velocity, the t-th vehicle velocity, the t-th vehicle yaw rate, the t-th object heading angle, and the t-th time difference, and wherein the t-th vector for estimating the absolute acceleration of the object includes the t-th raw object relative distance, the t-th raw object absolute velocity, the t-th vehicle velocity, the t-th vehicle acceleration, the t-th vehicle yaw rate, the t-th object heading angle, and the t-th time difference; and
  wherein, at the process of (II), the processor instructs the sequential regression network to (i) generate a t-th prediction object relative distance which is a result of predicting the relative distance of the object with respect to the vehicle in the t-th image frame by applying a recurrent operation to the t-th vector for estimating the relative distance of the object through an object relative distance estimating model, (ii) generate a t-th prediction object absolute velocity which is a result of predicting the absolute velocity of the object in the t-th image frame by applying a recurrent operation to the t-th vector for estimating the absolute velocity of the object through an object absolute velocity estimating model, (iii) generate a t-th prediction object absolute acceleration which is a result of predicting the absolute acceleration of the object in the t-th image frame by applying a recurrent operation to the t-th vector for estimating the absolute acceleration of the object through an object absolute acceleration estimating model, and thus (iv) generate the t-th prediction object motion data which includes the t-th prediction object relative distance, the t-th prediction object absolute velocity, and the t-th prediction object absolute acceleration.

19. The object motion estimating device of claim 18, wherein, at the process of (I), the processor instructs the data preprocessing module to generate the t-th vector for estimating the motion of the object, such that each of the t-th vector for estimating the relative distance of the object, the t-th vector for estimating the absolute velocity of the object, and the t-th vector for estimating the absolute acceleration of the object further includes a t-th vehicle pitch which is a pitch of the vehicle in the t-th image frame, and a t-th vehicle roll which is a roll of the vehicle in the t-th image frame.

20. The object motion estimating device of claim 11, wherein, at the process of (II), the sequential regression network comprises one of an RNN (Recurrent Neural Network), an LSTM (Long Short-Term Memory), and a GRU (Gated Recurrent Unit).

* * * * *